US012221565B2

United States Patent
Miyano et al.

(10) Patent No.: US 12,221,565 B2
(45) Date of Patent: Feb. 11, 2025

(54) BONDED STRUCTURE

(71) Applicant: DENSO CORPORATION, Kariya (JP)

(72) Inventors: Hirotaka Miyano, Kariya (JP); Masami Saito, Kariya (JP); Kazuhiro Morita, Kariya (JP); Taiga Handa, Morioka (JP); Katsuhito Mori, Morioka (JP); Kunio Mori, Morioka (JP)

(73) Assignee: DENSO CORPORATION, Kariya (JP)

( * ) Notice: Subject to any disclaimer, the term of this patent is extended or adjusted under 35 U.S.C. 154(b) by 213 days.

(21) Appl. No.: 17/948,318

(22) Filed: Sep. 20, 2022

(65) Prior Publication Data

US 2023/0098430 A1    Mar. 30, 2023

(30) Foreign Application Priority Data

Sep. 22, 2021    (JP) .................................. 2021-154165

(51) Int. Cl.
*C09J 5/04*     (2006.01)
*B32B 7/12*     (2006.01)
(Continued)

(52) U.S. Cl.
CPC .................... *C09J 5/04* (2013.01); *B32B 7/12* (2013.01); *B32B 9/005* (2013.01); *B32B 9/041* (2013.01);
(Continued)

(58) Field of Classification Search
CPC .. C09J 5/04; C09J 2301/208; C09J 2301/312; B32B 7/12; B32B 9/005; B32B 9/041;
(Continued)

(56) References Cited

U.S. PATENT DOCUMENTS

2015/0316061 A1* 11/2015 Hinge ........................ C08J 5/06
156/307.1
2017/0044337 A1* 2/2017 Van Tooren ........ B29C 37/0078
(Continued)

FOREIGN PATENT DOCUMENTS

JP       2017-179257 A    10/2017
JP       2017183200 A     10/2017
(Continued)

OTHER PUBLICATIONS

DeVoto, Douglas et al., "Reliability of Bonded Interfaces for Automotive Power Electronics", Proceedings of the ASME 2013 International Technical Conference and Exhibition on Packaging and Integration of Electronic and Photonic Microsystems InterPACK2013, Jul. 16-18, 2013, pp. 1-8.

*Primary Examiner* — John D Freeman
(74) *Attorney, Agent, or Firm* — Harness, Dickey & Pierce, P.L.C.

(57) ABSTRACT

A bonded structure includes a first bonded member having a first bonding surface, a second bonded member having a second bonding surface, and a bonding layer that bonds the first bonding surface and the second bonding surface. The bonding layer includes a stress relaxation layer containing a chain polymer, a first bonded molecular layer containing a first bonded molecule bonded to the first bonding surface, and a second bonded molecular layer containing a second bonded molecule bonded to the second bonding surface. A first end of the chain polymer is bonded to the first bonded molecule via a first binding molecule or without bonding via the first binding molecule. A second end of the chain polymer is bonded to the second bonded molecule via a second binding molecule or without bonding via the second binding molecule.

10 Claims, 10 Drawing Sheets

(51) Int. Cl.
*B32B 9/00* (2006.01)
*B32B 9/04* (2006.01)
*B32B 15/20* (2006.01)

(52) U.S. Cl.
CPC .............. *B32B 9/045* (2013.01); *B32B 15/20* (2013.01); *B32B 2255/06* (2013.01); *B32B 2255/26* (2013.01); *C09J 2301/208* (2020.08); *C09J 2301/312* (2020.08)

(58) Field of Classification Search
CPC ..... B32B 9/045; B32B 15/20; B32B 2255/06; B32B 2255/26
See application file for complete search history.

(56) References Cited

U.S. PATENT DOCUMENTS

| | | | |
|---|---|---|---|
| 2017/0152410 A1 | 6/2017 | Aoyama et al. | |
| 2023/0085997 A1* | 3/2023 | Yang | H05K 3/386 |
| | | | 174/259 |

FOREIGN PATENT DOCUMENTS

| | | |
|---|---|---|
| JP | 2020053451 A | 4/2020 |
| JP | 2020053452 A | 4/2020 |
| JP | 2020053453 A | 4/2020 |
| WO | WO-2016031552 A1 | 3/2016 |

\* cited by examiner

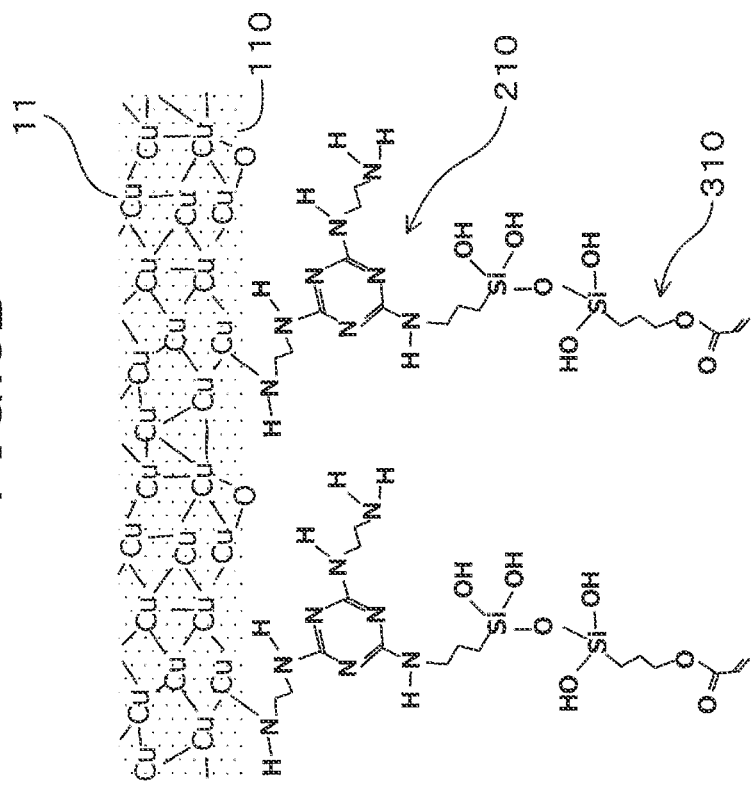
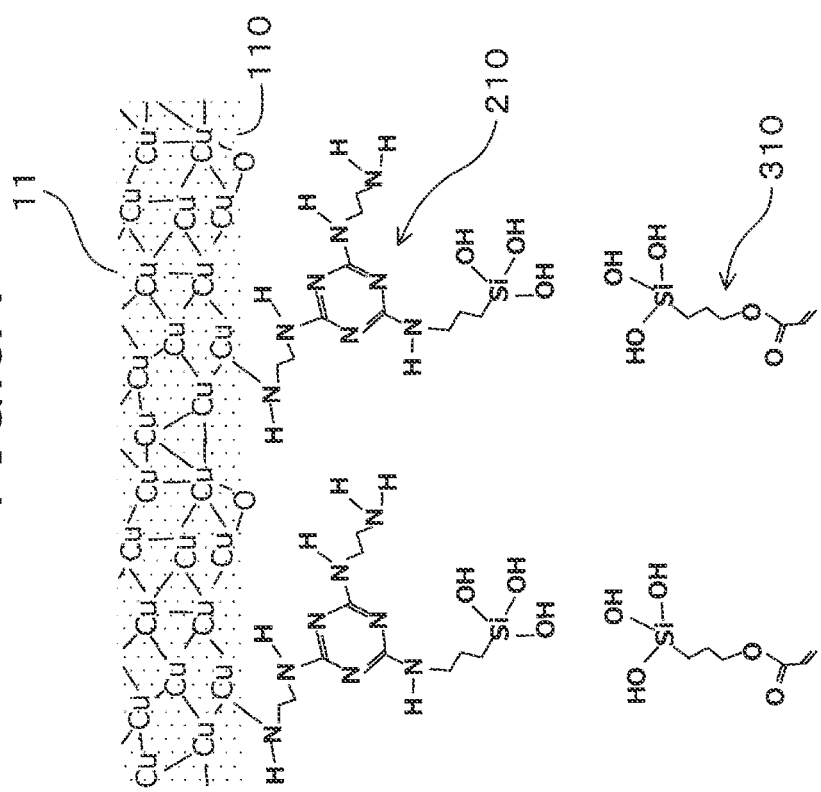

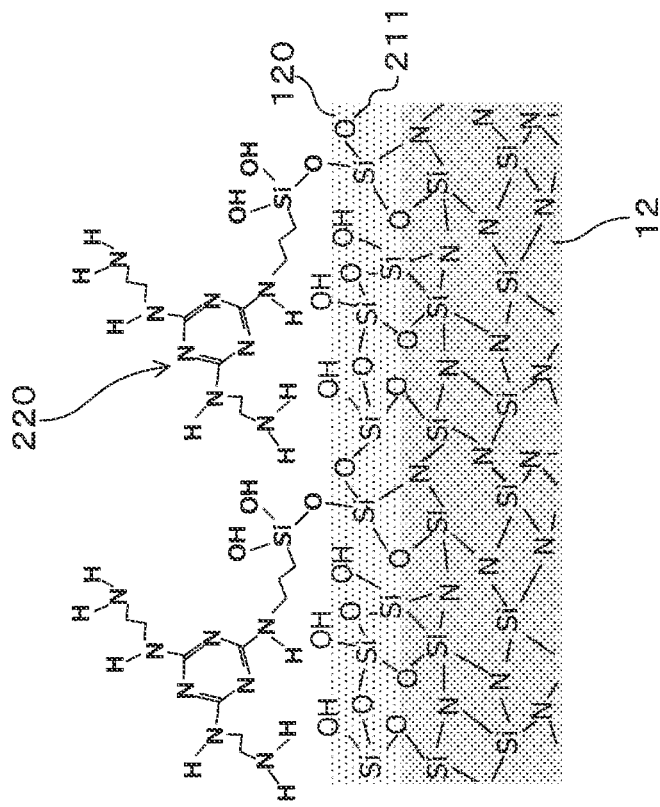
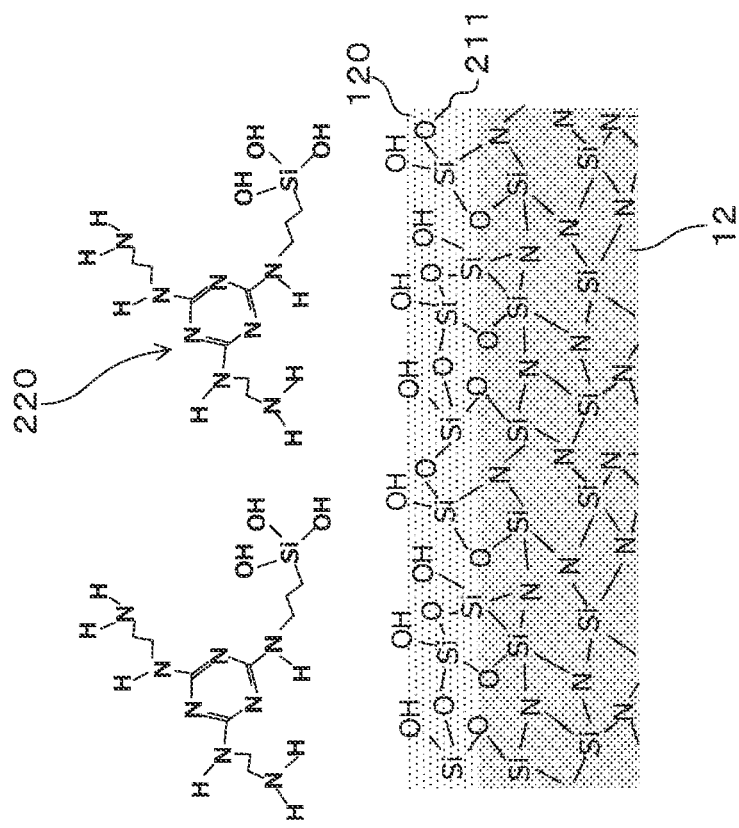
FIG. 4A
FIG. 4B

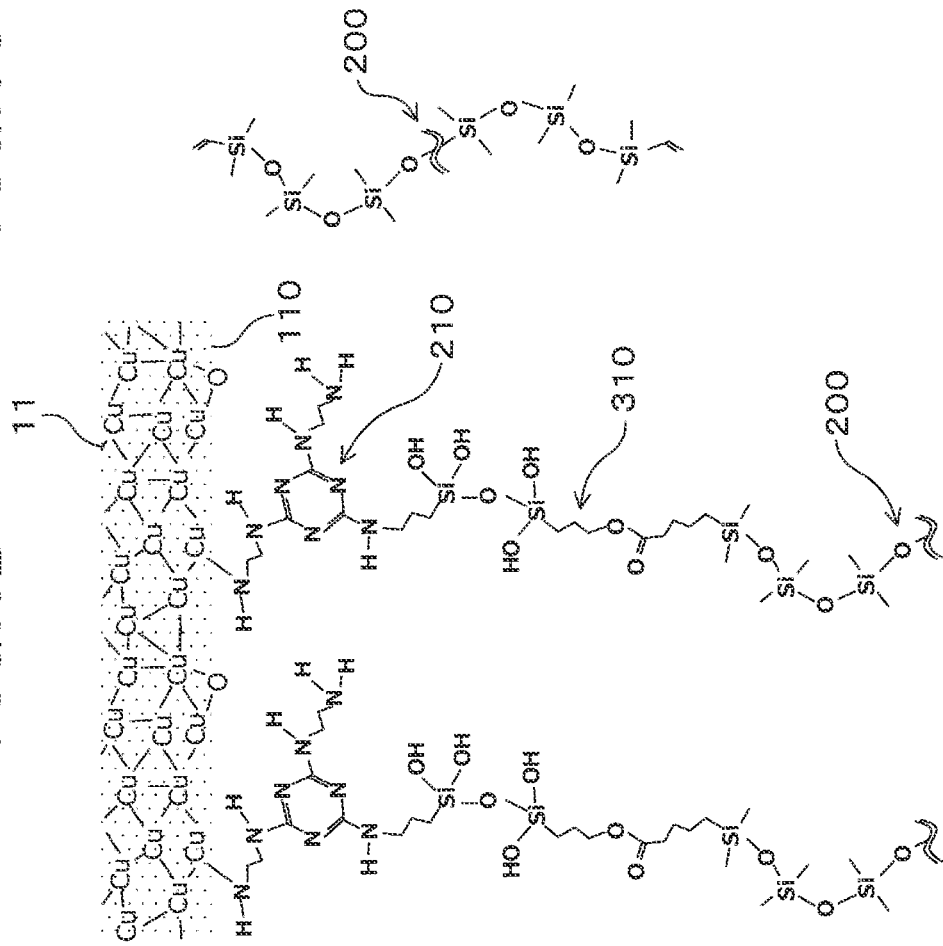
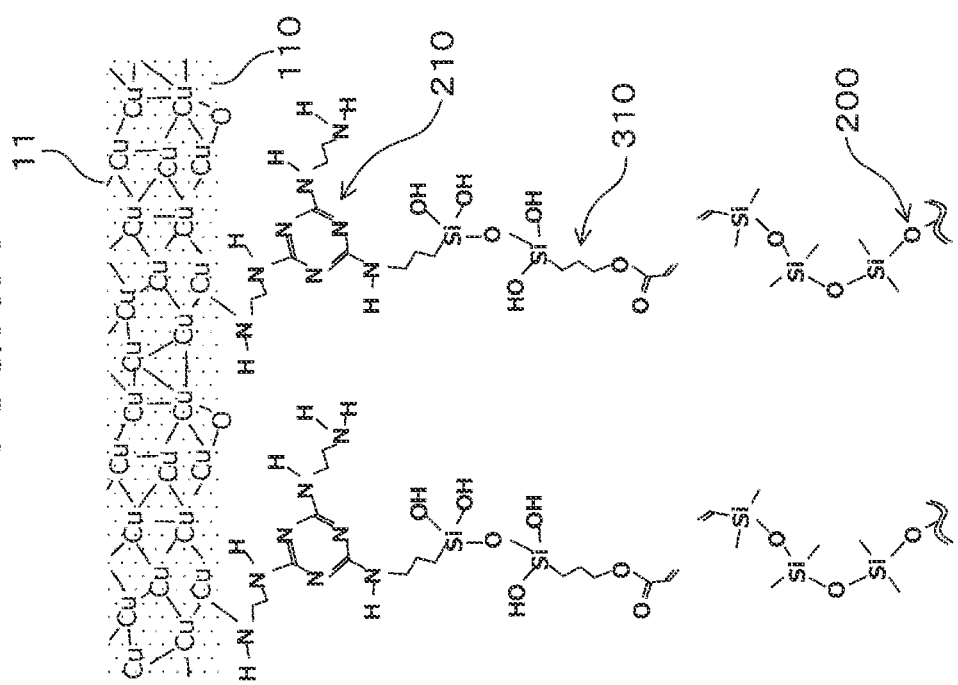

BONDED STRUCTURE

CROSS-REFERENCE TO RELATED APPLICATION

This application is based on and claims the benefit of priority from earlier Japanese Patent Application No. 2021-154165, filed in Japan on 22 Sep. 2021, the description of which is hereby incorporated by reference.

BACKGROUND

1. Technical Field

The present disclosure relates to a bonded structure.

2. Related Art

A bonded structure is formed of two bonded members made of different materials or the same material with their bonding surfaces bonded via a bonding layer. Examples of the materials for the bonded members include metal materials, ceramic materials, resin materials, and the like. Examples of the bonding layer typically include an adhesive made of a cured product of an adhesive resin composition.

SUMMARY

The present disclosure provides a bonded structure. As an aspect of the present disclosure, a bonded structure includes a first bonded member having a first bonding surface, a second bonded member having a second bonding surface, and a bonding layer that bonds the first bonding surface and the second bonding surface. The bonding layer includes: a stress relaxation layer containing a chain polymer, a first bonded molecular layer containing a first bonded molecule bonded to the first bonding surface, and a second bonded molecular layer containing a second bonded molecule bonded to the second bonding surface. A first end of the chain polymer is bonded to the first bonded molecule via a first binding molecule or without bonding via the first binding molecule. A second end of the chain polymer is bonded to the second bonded molecule via a second binding molecule or without bonding via the second binding molecule.

BRIEF DESCRIPTION OF THE DRAWINGS

In the accompanying drawings:

FIGS. 3A and 3B are views illustrating a part of a method of producing a bonded structure of the second embodiment, in which FIG. 3A shows a state before first binding molecules bind to first bonded molecules bonded to a first bonding surface, and FIG. 3B shows a state after the first binding molecules bind to the first bonded molecules bonded to the first bonding surface;

FIGS. 4A and 4B are views illustrating a part of a method of producing a bonded structure of the second embodiment, in which FIG. 4A shows a state before second bonded molecules bind to a second bonding surface, and FIG. 4B shows a state after the second bonded molecules bind to the second bonding surface;

FIGS. 5A and 5B are views illustrating a part of a method of producing a bonded structure of the second embodiment, in which FIG. 5A shows a state before second binding molecules bind to second bonded molecules bonded to a second bonding surface, and FIG. 5B shows a state after the second binding molecules bind to the second bonded molecules bonded to the second bonding surface;

FIGS. 6A to 6C are views illustrating a part of a method of producing a bonded structure of the second embodiment, in which FIG. 6A shows a state before first ends of chain polymers bind to first binding molecules, and FIG. 6B shows a state after the first ends of the chain polymers bind to the first binding molecules, and FIG. 6C shows a structure of the chain polymer used in FIGS. 6A and 6B;

FIGS. 7A and 7B are views illustrating a part of a method of producing a bonded structure of the second embodiment, in which FIG. 7A shows a state before second ends of chain polymers bind to second binding molecules, and FIG. 7B shows a state after the second ends of the chain polymers bind to the second binding molecule;

DETAILED DESCRIPTION OF THE PREFERRED EMBODIMENTS

Figure 1:
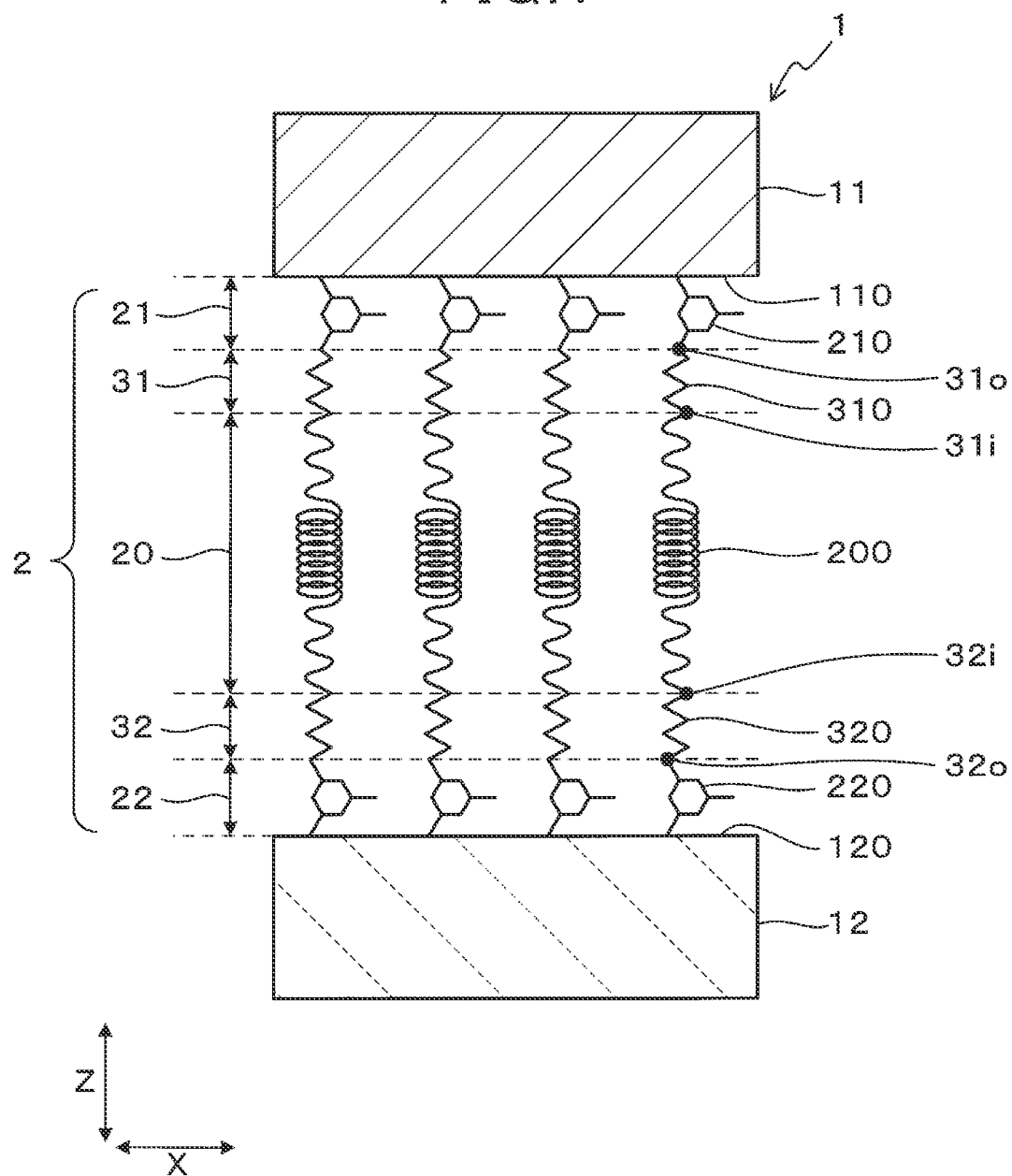
FIG. 1 is a schematic diagram of a bonded structure of a first embodiment.

For example, JP 2017-179257 A discloses a technique in which a bonding layer that bonds two members together is composed of a cured product of an adhesive made of a stress relaxation agent which contains chain polymers and cyclic molecules having polymerizable functional groups.

The bonding layer has poor interfacial bondability (bond strength) between the bonding layer and the members to be bonded since binding of the adhesive components or reaction between the adhesive components occurs during bonding. Poor interfacial bondability leads to interfacial peeling due to, for example, stress caused by a difference in thermal expansion between the bonded members, even when the bonding layer itself has stress relaxation capability. Further, even when a stress relaxation agent such as that disclosed in JP 2017-179257 A is used, it cannot contribute to interfacial bonding, so it is difficult to improve interfacial bondability.

It is thus desired to provide a bonded structure capable of relaxing stress applied to a bonding layer and suppressing occurrence of interfacial peeling of the bonding layer.

According to one or more aspects of the present disclosure, a bonded structure includes: a first bonded member having a first bonding surface; a second bonded member having a second bonding surface; and a bonding layer that bonds the first bonding surface and the second bonding surface.

The bonding layer includes: a stress relaxation layer containing a chain polymer; a first bonded molecular layer containing a first bonded molecule bonded to the first bonding surface; and a second bonded molecular layer containing a second bonded molecule bonded to the second bonding surface.

A first end of the chain polymer is bonded to the first bonded molecule via a first binding molecule. Alternatively, the first end of the chain polymer may be bonded to the first bonded molecule without bonding via the first binding molecule.

A second end of the chain polymer is bonded to the second bonded molecule via a second binding molecule. Alternatively, the second end of the chain polymer may be bonded to the second bonded molecule without bonding via the second binding molecule.

The above bonded structure has a configuration in which the bonding layer that bonds at least two bonding surfaces to each other includes a stress relaxation layer containing the chain polymers. Therefore, when a stress is applied to the bonding layer, the stress relaxation layer in the bonded structure can relax the stress applied to the bonding layer.

Further, in the above bonded structure, the ends of the chain polymers of the stress relaxation layer bind to the bonded molecules by any of the following four bonding patterns.

Specifically, in the first pattern, the first ends of the chain polymers of the stress relaxation layer bind to the first bonded molecules via the first binding molecules, the first bonded molecules being bonded to the first bonding surface, and the second ends of the chain polymers of the stress relaxation layer bind to the second bonded molecules via the second binding molecules, the second bonded molecules being bonded to the second bonding surface. In the second pattern, the first ends of the chain polymers of the stress relaxation layer bind to the first bonded molecules without bonding via the first binding molecules, the first bonded molecules being bonded to the first bonding surface, and the second ends of the chain polymers of the stress relaxation layer bind to the second bonded molecules without bonding via the second binding molecules, the second bonded molecules being bonded to the second bonding surface. In the third pattern, the first ends of the chain polymers of the stress relaxation layer bind to the first bonded molecules via the first binding molecules, the first bonded molecules being bonded to the first bonding surface, and the second ends of the chain polymers of the stress relaxation layer bind to the second bonded molecules without bonding via the second binding molecules, the second bonded molecules being bonded to the second bonding surface. In the fourth pattern, the first ends of the chain polymers of the stress relaxation layer bind to the first bonded molecules without bonding via the first binding molecules, the first bonded molecules being bonded to the first bonding surface, and the second ends of the chain polymers of the stress relaxation layer bind to the second bonded molecules via the second binding molecules, the second bonded molecules being bonded to the second bonding surface.

According to the above configuration, the interfacial bondability of the adhesive layer is improved. Accordingly, in the above bonded structure, occurrence of interfacial peeling of the bonding layer can be suppressed. Therefore, the above bonded structure is able to relax stress applied to the bonding layer and suppress occurrence of interfacial peeling of the bonding layer.

The above-described and other objects, features, and advantages will be clarified by the following detailed description with reference to the accompanied drawings.

Embodiments of the present disclosure are described below with reference to the drawings.

First Embodiment

With reference to FIG. 1, a bonded structure of a first embodiment will be described. As shown in FIG. 1, a bonded structure 1 of the present embodiment includes a first bonded member 11 having a first bonding surface 110, a second bonded member 12 having a second bonding surface 120, and a bonding layer 2 that bonds the first bonding surface 110 and the second bonding surface 120.

Examples of the materials for the first bonded member 11 and the second bonded member 12 include metal materials (metals include alloys, the same applies hereinafter), ceramic materials, resin materials, and the like. The first bonded member 11 and the second bonded member 12 may be made of the same material or different materials. Examples of a combination of different materials of the first bonded member 11 and the second bonded member 12 include a metal material and a ceramic material, a metal material and a resin material, a ceramic material and a resin material, and the like. When the material of the first bonded member 11 is different from the material of the second bonded member 12, stress due to a difference in linear expansion coefficient is likely to occur. In this case, the bonding layer 2 can effectively exhibit an effect of suppressing occurrence of interfacial peeling by improving the interfacial bondability. It should be noted that, even when the first bonded member 11 and the second bonded member 12 are made of the same (similar) material, heat may be applied to one of the bonded members and not to the other. Even in such a case, the bonded structure 1 of the present embodiment can exhibit an effect of suppressing occurrence of the above interfacial peeling.

Example of the metal material include nickel, nickel alloys, zinc, zinc alloys, aluminum, aluminum alloys, iron, iron-based alloys, copper, copper alloys, and silicon. The surface of the metal material may have a natural oxide film, or the natural oxide film may be removed. Further, the surface of the metal material may have a surface treatment layer such as a catalyst layer. The metal material may have a linear expansion coefficient of, for example, 2 ppm/° C. or more and 50 ppm/° C. or less. Examples of the ceramic material include silicon nitride, aluminum nitride, silicon carbide, alumina, glass such as silicon dioxide, and titanium oxide. The surface of the ceramic material may have a surface treatment layer such as an activated layer obtained by surface treatment such as corona treatment, plasma treatment, or the like. The ceramic material may have a linear expansion coefficient of, for example, 0 ppm/° C. or more and 10 ppm/° C. or less. Examples of the resin material include liquid crystal polymer (LCP), thermosetting resin (phenol resin, epoxy resin, silicone resin, etc.), and thermoplastic resin (ester resin, olefin resin, polyphenylene sulfide resin, polyimide resin, polyamide resin, etc). The resin material may contain an additive such as an inorganic filler. The resin material may have a linear expansion coefficient of, for example, 15 ppm/° C. or more and 500 ppm/° C. or less. The linear expansion coefficient of each material can be measured by thermomechanical analysis (TMA). As the value of the linear expansion coefficient, a value at 25° C. is used.

Both the first bonding surface 110 and the second bonding surface 120 may be, for example, formed as a flat surface or a curved surface, or one of these surfaces may be formed as a flat surface and the other may be formed as a curved surface. Further, the first bonding surface 110 may be all or a part of the surface of the first bonded member 11. The second bonding surface 120 may be all or a part of the surface of the second bonded member 12.

The bonded structure 1 may be configured such that the value of the linear expansion coefficient (third linear expansion coefficient) of the first bonded member 11 differs from the value of the linear expansion coefficient (fourth linear expansion coefficient) of the second bonded member 12 by one or more orders of magnitude. With this configuration, it is possible to obtain a bonded structure 1 having high stress relaxation effect and bond strength even when the first bonded member 11 and the second bonded member 12 are made of different materials. In the above configuration, when the linear expansion coefficient of the first bonded member 11 is larger than the linear expansion coefficient of the second bonded member 12, a relationship of log{(linear expansion coefficient of the first bonded member 11)/(linear expansion coefficient of the second bonded member 12)}>1 is satisfied. Further, when the linear expansion coefficient of the second bonded member 12 is larger than the linear expansion coefficient of the first bonded member 11, a relationship of log{(linear expansion coefficient of the second bonded member 12)/(linear expansion coefficient of the first bonded member 11)}>1 is satisfied. The log in the above formulas is a common logarithm. For example, a linear expansion coefficient of a ceramic material such as glass of silicon nitride is approximately 0 ppm/° C.-5 ppm/° C., and a linear expansion coefficient of a metal material such as aluminum or copper is approximately 10 ppm/° C.-20 ppm/° C. Therefore, combinations of the metal material and the ceramic material can satisfy the above relationships. The linear expansion coefficient (ppm/° C.) of each of the first bonded member 11 and the second bonded member 12 can be measured by thermomechanical analysis (TMA). As the value of the linear expansion coefficient, a value at 25° C. is used.

The bonding layer 2 includes a stress relaxation layer 20, a first bonded molecular layer 21, and a second bonded molecular layer 22. The stress relaxation layer 20 is a layer including chain polymers 200. The first bonded molecular layer 21 is a layer containing first bonded molecules 210 bonded to the first bonding surface 110. The second bonded molecular layer 22 is a layer containing second bonded molecules 220 bonded to the second bonding surface 120. In the bonding layer 2, one of the ends (first end) of the chain polymer 200 is bonded to the first bonded molecule 210 via a first binding molecule 310. Alternatively, the first end of the chain polymer 200 may be bonded to the first bonded molecule 210 without bonding via the first binding molecule 310. The other of the ends (second end) of the chain polymer 200 is bonded to the second bonded molecule 220 via a second binding molecule 320. Alternatively, the second end of the chain polymer 200 may be bonded to the second bonded molecule 220 without bonding via the second binding molecule 320.

As illustrated in FIG. 1, the stress relaxation layer 20 is disposed between the first bonded molecular layer 21 and the second bonded molecular layer 22. In the example shown in FIG. 1, the first end of the chain polymer 200 is bonded to the first binding molecule 310, which is in turn bonded to the first bonded molecule 210. Further, the second end of the chain polymer 200 is bonded to the second binding molecule 320, which is in turn bonded to the second bonded molecule 220. In the example shown in FIG. 1, a first binding layer 31 is formed between the stress relaxation layer 20 and the first bonded molecular layer 21. Further, a second binding layer 32 is formed between the stress relaxation layer 20 and the second bonded molecular layer 22. The first binding layer 31 contains the first binding molecules 310 that bond the first ends of the chain polymers 200 and the first bonded molecules 210. The second binding layer 32 contains the second binding molecule 320 that bond the second ends of the chain polymers 200 and the second bonded molecules 220.

Although not shown, in the bonding layer 2, when the first ends of the chain polymers 200 are directly bonded to the first bonded molecules 210 without bonding via the first binding molecules 310, the first binding layer 31 is not required. Similarly, when the second ends of the chain polymers 200 are directly bonded to the second bonded molecules 220 without bonding via the second binding molecules 320, the second binding layer 32 is not required. That is, the bonding layer 2 may include both the first binding layer 31 and the second binding layer 32, or either the first binding layer 31 or the second binding layer 32. Further, the bonding layer 2 may not necessarily include both the first binding layer 31 and the second binding layer 32.

Preferably, linear polymers described below can be used as the chain polymer 200 in a state before binding of both ends (first end and second end). For example, a linear polymer having a functional group capable of binding to the first binding molecule 310 at the first end and a functional group capable of binding to the second binding molecule 320 at the second end can be used as the chain polymer 200. Alternatively, a linear polymer having a functional group capable of binding to the first bonded molecule 210 at the first end and a functional group capable of binding to the second bonded molecule 220 at the second end can be used as the chain polymer 200. FIG. 1 shows an example using the former chain polymer 200.

The chain polymer 200 may have a terminal functional group such as a vinyl group, an acyl group, a silyl group, a carboxy group, an epoxy group, an ethoxysilyl group, a silanol group, an amino group, a thiol group, or the like. The functional group at the first end and the functional group at the second end of the chain polymer 200 may be the same or different from each other.

The chain polymer 200 is preferably elastic from the perspective of improving the stress relaxation effect. The main chain constituting the chain polymer 200 can be composed of, for example, a silicone chain, an alkyl chain, an ester chain, an olefin chain, a phenyl alkyl chain, or a copolymer of these chains. The chain polymer 200 having the above main chain is suitable for enhancing the stress relaxation effect. FIG. 1 shows an example in which the chain polymer 200 is a linear type and extends in a lamination direction Z (oriented in the lamination direction Z).

The chain polymer 200 preferably has a molecular weight in a range of 5,000 or more and 150,000 or less. With this configuration, the chain polymer 200 has good elasticity, enhancing the stress relaxation effect and suppressing occurrence of interfacial peeling of the bonding layer 2. For obtaining the above effects, the lower limit of the molecular weight of the chain polymer 200 is preferably 6,000 or more, more preferably 10,000 or more, and still more preferably 30,000 or more. The molecular weight of the chain polymer 200 is preferably in a range that ensures the binding density to each of the first binding molecule 310 and the second binding molecule 320 (when the chain polymer 200 directly binds to the first bonded molecule 210 and the second bonded molecule 220, binding density to each of the first bonded molecule 210 and the second bonded molecule 220, respectively) and bindability between the ends of the chain polymer 200, and suppresses occurrence of interfacial peeling of the bonding layer 2. From the above viewpoint, the upper limit of the molecular weight of the chain polymer 200 is preferably 140,000 or less, more preferably 120,000 or less, and still more preferably 80,000 or less. The molecular weight of the chain polymer 200 can be measured by a gel permeation chromatography (GPC) method.

Preferably, molecules described below can be used as the first bonded molecule 210 in a state before binding. For example, molecules having a functional group capable of binding to the first binding molecule 310 and a functional group capable of binding to the first bonded member 11 can be used as the first bonded molecule 210. Alternatively, molecules having a functional group capable of binding to the first end of the chain polymer 200 and a functional group capable of binding to the first bonded member 11 can be used as the first bonded molecule 210. Preferably, molecules described below can be used as the second bonded molecule 220 in a state before binding. For example, molecules having a functional group capable of binding to the second binding molecule 320 and a functional group capable of binding to the second bonded member 12 can be used as the second bonded molecule 220. Alternatively, molecules having a functional group capable of binding to the second end of the chain polymer 200 and a functional group capable of binding to the second bonded member 12 can be used as the second bonded molecule 220. Examples of the functional group capable of binding to the first binding molecule 310 or the first end of the chain polymer 200, and the functional group capable of binding to the second binding molecule 320 or the second end of the chain polymer 200 include a silanol group, an acryloxy group, a methacryloxy group, an ethoxysilyl group, a thiol group, an epoxy group, an isocyanate group, a silyl group, a carboxy group, a hydroxy group, an acyl group, an amino group, and the like. Examples of the functional group capable of binding to the first bonded member 11 and the functional group capable of binding to the second bonded member 12 include an amino group, a silanol group, an ethoxysilyl group, a thiol group, an epoxy group, an isocyanate group, a silyl group, a carboxy group, a hydroxy group, an acyl group, and the like.

Examples of the first bonded molecule 210 and the second bonded molecule 220 include molecules having a triazine ring, an amino group and a silanol group, such as N, N'-bis(2-aminoethyl)-6-(3-triethoxysilylpropyl)amino-1,3, 5-triazine-2,4-diamine, triethoxysilylpropyl triazine dithiol, 2,4-diazido-6-(triethoxysilylpropyl)amino-1,3,5-triazine, and the like. These can be used singly or in combination of two or more. The first bonded molecule 210 and the second bonded molecule 220 may be the same or different from each other. The first bonded molecule 210 and the second bonded molecule 220 preferably contain a triazine ring from the viewpoint that they can bind to the first bonded member 11 and the second bonded member 12, respectively, and can be adsorbed to the interface at high density.

In the bonding layer 2, the bond between the first bonded molecule 210 and the first bonding surface 110, and the bond between the second bonded molecule 220 and the second bonding surface 120 are preferably chemical bonds. This configuration enhances the interfacial strength between the first bonding surface 110 and the first bonded molecular layer 21 and the interfacial strength between the second bonding surface 120 and the second bonded molecular layer 22. Accordingly, this configuration can suppress occurrence of interfacial peeling of the bonding layer 2. Examples of the chemical bond include a covalent bond and an ionic bond. These bonds are stronger than a hydrogen bond and the like. Accordingly, these bonds can ensure the above effects.

Preferably, molecules described below can be used as the first binding molecule 310 in a state before binding. For example, molecules having a functional group capable of binding to the first bonded molecule 210 and a functional group capable of binding to the first end of the chain polymer 200 can be used as the first binding molecule 310. Preferably, molecules described below can be used as the second binding molecule 320 in a state before binding. For example, molecules having a functional group capable of binding to the second bonded molecule 220 and a functional group capable of binding to the second end of the chain polymer 200 can be used as the second binding molecule 320. Examples of the functional group capable of binding to the first bonded molecule 210 and the functional group capable of binding to the second bonded molecule 220 include a silanol group and the like. Examples of the functional group capable of binding to the end of the chain polymer 200 include an acryloxy group, a methacryloxy group, a vinyl group, and the like.

Examples of the first binding molecule 310 and the second binding molecule 320 include acryloxypropyltrialkoxysilane, methacryloxypropyltrialkoxysilane, aminoalkyltrialkoxysilane, trialkoxysilylalkylisocyanate, mercaptoalkyltrialkoxysilane, and the like. These can be used singly or in combination of two or more. The first binding molecule 310 and the second binding molecule 320 may be the same or different from each other.

When the bonding layer 2 includes the first binding layer 31, the bonding layer 2 can have an inner binding site 31, formed by a reaction between a functional group at the first end of the chain polymer 200 before binding and a functional group of the first binding molecule 310 before binding. Further, the bonding layer 2 can have an outer binding site 310 formed by a reaction between a functional group of the first binding molecule 310 before binding and a functional group of the first bonded molecule 210 before binding. Similarly, when the bonding layer 2 includes the second binding layer 32, the bonding layer 2 can have an inner binding site 32, formed by a reaction between a functional group at the second end of the chain polymer 200 before binding and a functional group of the second binding molecule 320 before binding. Further, the bonding layer 2 can have an outer binding site $32_o$ formed by a reaction between a functional group of the second binding molecule 320 before binding and a functional group of the second bonded molecule 220 before binding.

Although not shown, when the bonding layer 2 does not include the first binding layer 31, the bonding layer 2 can have a first binding site formed by a reaction between a functional group at the first end of the chain polymer 200 before binding and a functional group of the first bonded molecule 210 before binding. Similarly, when the bonding layer 2 does not include the second binding layer 32, the bonding layer 2 can have a second binding site formed by a reaction between a functional group at the second end of the chain polymer 200 before binding and a functional group of the second bonded molecule 220 before binding.

Examples of a combination of a terminal functional group of the chain polymer 200 and a functional group of the first binding molecule 310 (or a functional group of the first bonded molecule 210) to be reacted with the terminal functional group of the chain polymer 200 and a combination of a terminal functional group of the chain polymer 200 and a functional group of the second binding molecule 320 (or a functional group of the second bonded molecule 220) to be reacted with the terminal functional group of the chain polymer 200 include the following combinations. Specific examples include combinations of a vinyl group or an acyl group and an acryloxy group, a silyl group and an acryloxy group, a carboxy group and an amino group, a carboxy group and an isocyanate group, an epoxy group and an isocyanate group, an epoxy group and an amino group, an epoxy group and a thiol group, an epoxy group and a silanol group or a hydroxy group, an ethoxysilyl group and a silanol group or a hydroxy group, a silanol group and a silanol group or a hydroxy group, and the like. The combination of functional groups at the first end of the chain polymer 200 and the combination of functional groups at the second end of the chain polymer 200 may be the same or different from each other.

The bonding layer 2 preferably has anisotropic thermal expansion in the lamination direction Z. According to this configuration, the bonding layer 2 thermally expands and contracts in the lamination direction Z (bonding direction) according to the thermal history, but is not likely to thermally expand and contract in a direction X perpendicular to the lamination direction Z. Therefore, according to this configuration, the bonding layer 2 is not likely to protrude in the direction X perpendicular to the lamination direction Z (not likely to creep in the direction X perpendicular to the lamination direction Z). As illustrated in FIG. 1, when the first bonding surface 110 and the second bonding surface 120 are flat surfaces, the lamination direction Z corresponds to a direction normal to the first bonding surface 110 and the second bonding surface 120.

The description that "the bonding layer 2 has anisotropic thermal expansion in the lamination direction Z" means that the linear expansion coefficient (first linear expansion coefficient) of the bonding layer 2 in the lamination direction Z is larger than the linear expansion coefficient (second linear expansion coefficient) in the direction X perpendicular to the lamination direction Z of the bonding layer 2. That is, first linear expansion coefficient>second linear expansion coefficient. These linear expansion coefficients can be measured by thermomechanical analysis (TMA). As the value of the linear expansion coefficient of the bonding layer 2 in the lamination direction Z, a value at 150° C. is used. The bonding layer 2 having anisotropic thermal expansion in the lamination direction Z can be obtained by, for example, binding the first end of the chain polymer 200 to the first bonded molecule 210 via the first binding molecule 310, and binding the second end of the chain polymer 200 to the second bonded molecule 220 via the second binding molecule 320. Further, it can be obtained by, for example, binding the first end of the chain polymer 200 to the first bonded molecule 210 without bonding via the first binding molecule 310, and binding the second end of the chain polymer 200 to the second bonded molecule 220 without bonding via the second binding molecule 320.

The bonding layer 2 is preferably configured such that an anisotropic ratio of thermal expansion, represented by the linear expansion coefficient of the bonding layer 2 in the lamination direction Z to the linear expansion coefficient of the bonding layer 2 in the direction X perpendicular to the lamination direction Z, is 3 or more. According to this configuration, the anisotropic thermal expansion of the bonding layer 2 in the lamination direction Z can be adjusted to appropriate properties for obtaining the effect caused by the above anisotropy, ensuring the effects described above. The above anisotropic ratio of thermal expansion is expressed by the formula: linear expansion coefficient of the bonding layer 2 in the lamination direction Z/linear expansion coefficient of the bonding layer 2 in the direction X perpendicular to the lamination direction Z.

The bonding layer 2 preferably has a thickness of 100 μm or less. Conventionally, when the bonding layer is thin, it is difficult to improve the interfacial bondability even if a viscous material or the like is used to reduce the elasticity of the bonding layer in order to suppress occurrence of peeling, or a stress relaxation agent is used. On the other hand, when the bonding layer 2 has a thickness of 100 μm or less, the effects of the present disclosure can be sufficiently exhibited. The thickness of the bonding layer 2 can be measured by subtracting the thickness of the first bonded member 11 and the thickness of the second bonded member 12 from the total thickness of the bonded structure 1. The thickness of the bonding layer 2 is an average of thickness measurements taken at 10 locations in the bonding layer 2.

The thickness of the bonding layer 2 may be preferably 80 μm or less, more preferably 50 μm or less, and still more preferably 30 μm or less from the perspective of improving the thermal characteristics of the bonded structure 1 and obtaining a small-sized bonded structure 1. Further, the thickness of the bonding layer 2 may be preferably 1 μm or more, more preferably 2 μm or more, and still more preferably 3 μm or more from the perspective of ensuring good stress relaxation properties and ensuring conformability to the unevenness of the surface of the bonding surface.

The bonding layer 2 may have an area of 400 $mm^2$ or more. Conventionally, when the bonding layer has a large area, it is difficult to improve the interfacial bondability even if a viscous material or the like is used to reduce the elasticity of the bonding layer in order to suppress occurrence of peeling, or a stress relaxation agent is used. On the other hand, according to the above configuration, the effects of the present disclosure can be sufficiently exhibited.

The area of the bonding layer 2 may be preferably 60,000 $mm^2$ or less, more preferably 15,000 $mm^2$ or less, and still more preferably 5,000 $mm^2$ or less from the perspective of reducing the limitation of the space into which the bonded structure 1 is mounted. Further, the area of the bonding layer 2 may be preferably 600 $mm^2$ or more, more preferably 900 $mm^2$ or more, and still more preferably 3,000 $mm^2$ or more from the perspective of improving the thermal characteristics and packaging capability required for the bonded structure 1.

The bonding layer 2 may have a Young's modulus of 1 MPa or less. According to this configuration, warpage and interfacial peeling of the bonding layer 2 are prevented by suppressing hardening of the bonding layer 2. Further, the Young's modulus of the bonding layer 2 may be preferably 0.005 MPa or more, and more preferably 0.05 MPa or more, and still more preferably 0.1 MPa or more from the perspective of improving the bonding positional accuracy by preventing displacement between the first bonded member 11 and the second bonded member 12. The method of measuring the Young's modulus of the bonding layer 2 will be described in detail in the experimental examples below.

The bonding layer 2 preferably has elongation of 1 μm/μm or more. According to this configuration, it is possible to increase the bond strength of the bonding layer 2 even when the bonding area is relatively large. Further, the elongation of the bonding layer 2 may be preferably 100 μm/μm or less, more preferably 60 μm/μm or less, and still more preferably 30 μm/μm or less from the perspective of improving the handleability of the bonded structure 1 including the thermal characteristics and bonding positional accuracy required for the bonded structure 1. The method of measuring the elongation of the bonding layer 2 will be described in detail in the experimental examples below.

The bonded structure 1 of the present embodiment can be manufactured in the following manner, for example, but not limited thereto. The first bonded molecules 210 are bonded to the first bonding surface 110 of the first bonded member 11 to form a first bonded molecular layer 21. Then, the first bonded molecules 210 of the first bonded molecular layer 21 are bonded to the first binding molecules 310 to form a first binding layer 31. Further, the second bonded molecules 220 are bonded to the second bonding surface 120 of the second bonded member 12 to form a second bonded molecular layer 22. Then, the second bonded molecules 220 of the second bonded molecular layer 22 are bonded to the second binding molecule 320 to form a second binding layer 32.

Then, a solution containing the chain polymers 200, a cross-linking agent, and a diluting solvent is applied to at least one of a surface of the first binding layer 31 and a surface of the second binding layer 32, followed by volatilization of the solvent. Then, the first bonding surface 110 and the second bonding surface 120 are bonded to each other, and subjected to thermocompression bonding. Accordingly, a bonding layer 2 is formed in which the first ends of the chain polymers 200 are bonded to the first binding molecules 310 while the second ends of the chain polymers 200 are bonded to the second binding molecules 320. Thus, the bonded structure 1 of the present embodiment can be prepared. The details will be described more specifically in a second embodiment below. In addition, when the first bonded molecules 210 are directly bonded to the first ends of the chain polymers 200 and/or the second bonded molecules 220 are directly bonded to the second ends of the chain polymers 200, the step of forming the first binding layer 31 and/or the second binding layer 32 may be omitted.

In the method of manufacturing the bonded structure 1, the functional groups are selected so that the rate of reaction of the terminal functional groups of the chain polymers 200 with the functional groups of the first binding molecules 310 (or the second binding molecules 320) is higher than the rate of reaction between the terminal functional groups of the chain polymers 200. Accordingly, the chain polymers 200 can preferentially bind to the first binding molecules 310 (or the second binding molecules 320). The same applied to the case where the terminal functional groups of the chain polymers 200 preferentially bind to the first bonded molecules 210 (or the second bonded molecules 220) without using the first binding molecules 310 (or the second binding molecules 320).

The above reaction rate can be calculated from the ratios and concentrations of various functional groups before reaction, and typical cross-linking temperatures, activation energies in various reactions, and the like. For example, it is assumed that a functional group a reacts with a functional group b to form a functional group ab. A reaction rate k is expressed by the formula k=Aexp(Ea/RT) from the Arrhenius equation. A is the frequency factor. Ea is the activation energy when the functional group a reacts with the functional group b to form a functional group ab. R is the gas constant. T is the absolute temperature. The frequency factor A∝va[a]vb[b], where va is the rate of the functional group a, [a] is the concentration of the functional group a, vb is the rate of the functional group b, and [b] is the concentration of the functional group b.

The bonded structure 1 of the present embodiment is applicable to various fields that require relaxation of stress applied to the bonding layer 2 and suppression of occurrence of interfacial peeling of the bonding layer 2. In particular, the bonded structure 1 can be suitably used for semiconductor devices, electric devices, and the like. In vehicles such as automobiles, many semiconductor devices and electric devices having power semiconductors and the like are used. In the semiconductor devices and electric devices, it is necessary to form a circuit while ensuring electrical conductivity and insulation. Further, since the elements generate heat due to high voltage and large current, it is necessary to ensure external dissipation of heat from the elements. Therefore, in the semiconductor devices, electric devices, and the like, a ceramic material for obtaining insulation properties and a metal material for obtaining electric properties and heat transfer properties may be bonded and used. Furthermore, in the semiconductor devices, electric devices, and the like, a resin material such as liquid crystal polymer and epoxy resin may be bonded and used for controlling the dielectric properties at the periphery of the elements and sealing the elements. For example, conventional bonded structures are formed of bonded members whose linear expansion coefficients are largely different from each other, such as a metal material and a ceramic material, a metal material and a resin material, a ceramic material and a resin material, or the like. Such conventional bonded structures cannot withstand deformation due to thermal expansion or thermal contraction caused by thermal history, and tend to cause interfacial peeling of the bonding layer. This problem is more obvious when the bonding area is larger and/or the thickness of the bonding layer is smaller. For example, when the bonding area is 400 mm² or more and the thickness of the bonding layer is 100 μm or less, it is difficult to improve the interfacial bondability even if a viscous material or the like is used to reduce the elasticity of the bonding layer and suppress occurrence of peeling, or a stress relaxation agent is used. Further, conventional bonded structures may have a configuration, for example, in which an adhesive material is sandwiched between the bonded members. Although such conventional bonded structures can reduce the thickness of the bonding layer, the bonding layer has poor interfacial bondability due to binding of the adhesive components and reaction between the adhesive components. Accordingly, the larger the bonding area, the more interfacial peeling of the bonding layer is likely to occur. On the other hand, the bonded structure 1 of the present embodiment can improve the interfacial bondability of the bonding layer 2 and suppress occurrence of interfacial peeling of the bonding layer 2. Further, according to the configuration of the bonding layer 2 of the bonded structure 1 of the present embodiment, the bonding layer 2 can have anisotropic thermal expansion in the lamination direction Z. Accordingly, in the bonded structure 1 of the present embodiment, the bonding layer 2 is not likely to protrude in the direction X perpendicular to the lamination direction Z due to the thermal history, improving the creep resistance of the bonding layer 2. Therefore, the bonded structure 1 of the present embodiment can be suitably used for semiconductor devices, electric devices, and the like. Examples of the first bonded member 11 and the second bonded member 12 include a circuit forming substrate, a heat radiating member, and the like.

Second Embodiment

With reference to FIGS. 2 to 9, a bonded structure of a second embodiment will be described. It should be noted that among the reference signs used in the second and subsequent embodiments, the same reference signs as those in the previously described embodiment refer to the same elements as those in the previously described embodiment unless otherwise specified.

Figure 2:
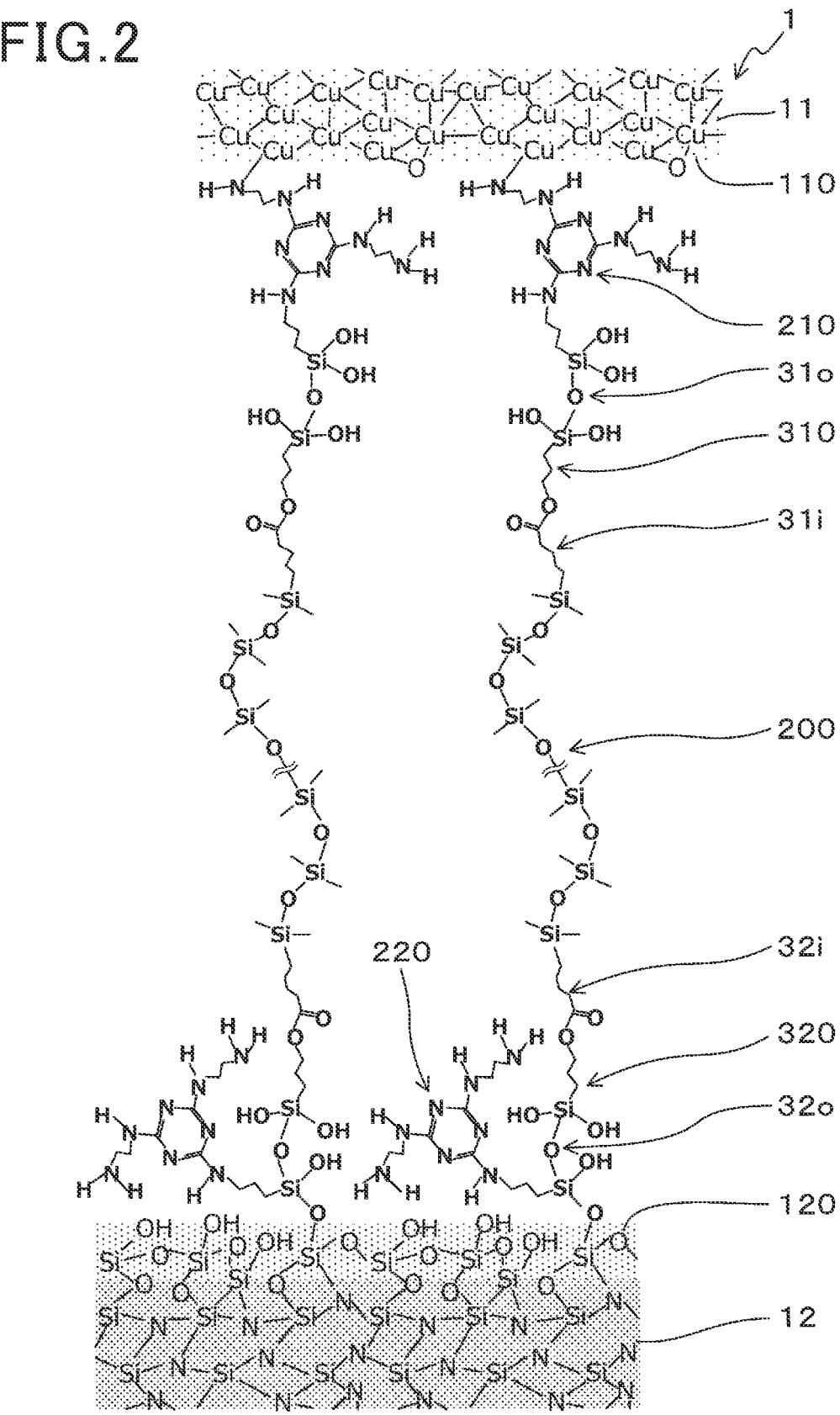
FIG. 2 is a schematic diagram of a bonded structure of a second embodiment.

As illustrated in FIG. 2, in the bonded structure 1 of the present embodiment, the first bonded member 11 is made of a metal material, specifically copper or a copper alloy. The second bonded member 12 is made of a ceramic material, specifically silicon nitride. The chain polymer 200 is derived from a silicone polymer having a silicone backbone and vinyl groups at both ends. Both the first bonded molecule 210 and the second bonded molecule 220 are molecules having a triazine ring, an amino group and a silanol group, and specifically derived from N, N'-bis(2-aminoethyl)-6-(3-triethoxysilylpropyl)amino-1,3,5-triazine-2,4-diamine Both the first binding molecule 310 and the second binding molecule 320 are molecules having a silanol group and an acryloxy group, and specifically derived from an acryloxypropyltrialkoxysilane.

Further, as shown in FIG. 2, in the bonded structure 1 of the present embodiment, the first bonded molecules 210 are bonded to the first bonding surface 110 of the first bonded member 11 via the amino groups. The outer binding sites $31_o$ are formed by binding of the silanol groups of the first bonded molecules 210 to the silanol groups of the first binding molecules 310. The inner binding sites $31_i$ are formed by binding of the acryloxy groups of the first binding molecules 310 to the vinyl groups at the first ends of the chain polymers 200. Similarly, in the bonded structure 1 of the present embodiment, the second bonded molecules 220 are bonded to the second bonding surface 120 of the second bonded member 12 via the silanol groups. The outer binding sites $32_o$ are formed by binding of the silanol groups of the second bonded molecules 220 to the silanol groups of the second binding molecules 320. The inner binding sites 31 are formed by binding of the acryloxy groups of the second binding molecules 320 to the vinyl groups at the second ends of the chain polymers 200.

The bonded structure 1 of the present embodiment can be manufactured by the following method, for example. The first bonding surface 110 made of copper or a copper alloy is degreased, and then subjected to pickling to remove the oxide film. Next, the first bonding surface 110 is exposed to a solution containing the first bonded molecules 210, and then dried. Thus, as shown in FIG. 3A, the first bonded molecules 210 are bonded to the first bonding surface 110 of the first bonded member 11 via the amino groups to form a first bonded molecular layer 21. Next, as shown in FIG. 3A, a surface of the first bonded molecular layer 21 is exposed to a solution containing the first binding molecules 310, and then dried. Thus, as shown in FIG. 3B, the silanol groups of the first bonded molecules 210 are bonded to the silanol groups of the first binding molecules 310 to form a first binding layer 31.

Figure 5A:
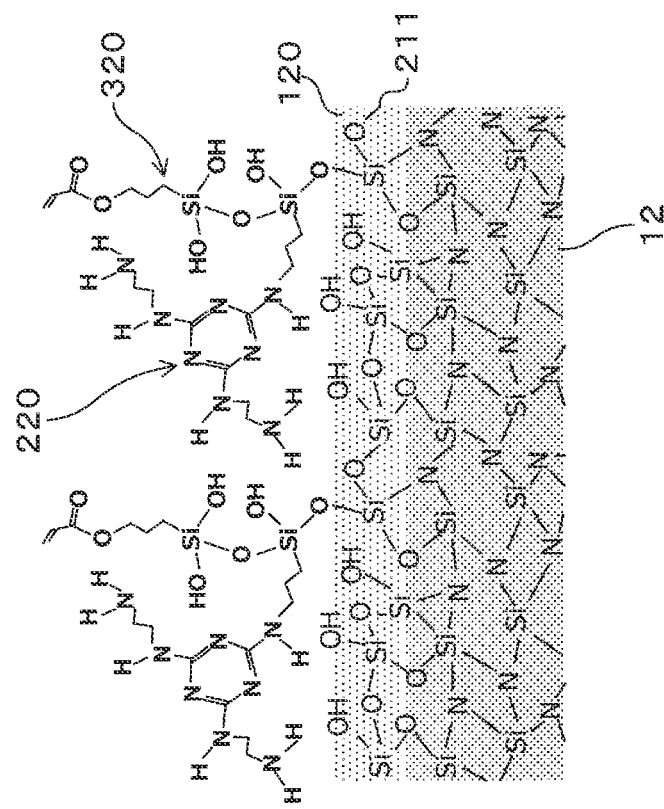
Figure 5B:
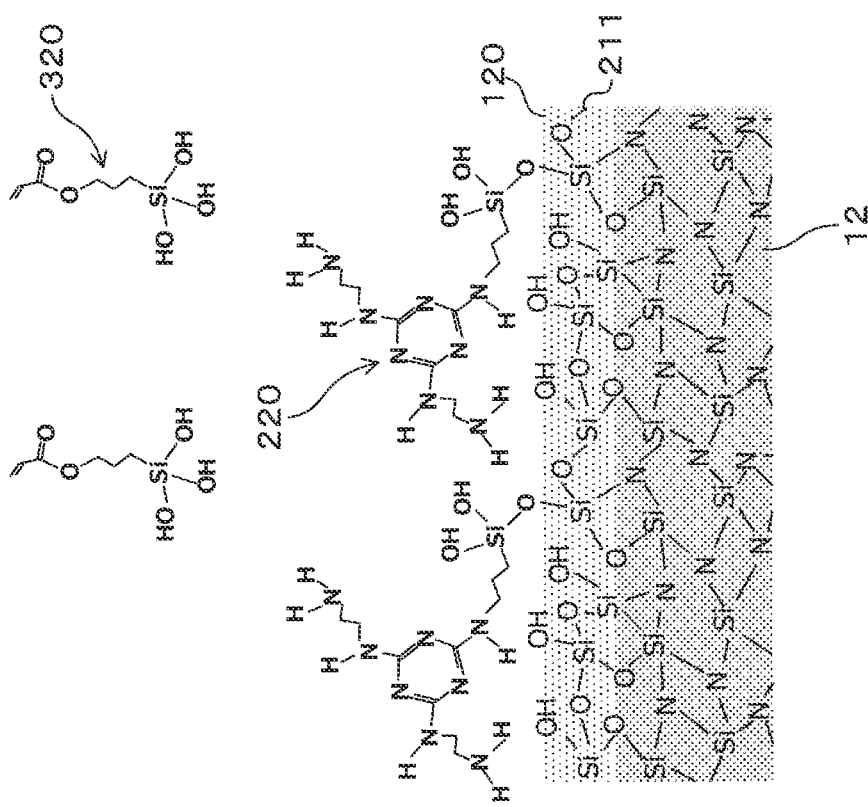

Further, the second bonding surface 120 made of silicon nitride is degreased, and then subjected to corona plasma treatment, alkali treatment, washed with water and dried to form an active layer 211 on the second bonding surface 120. Then, as shown in FIG. 4A, the second bonding surface 120 on which the active layer 211 is formed is exposed to a solution containing the second bonded molecules 220, and then dried. Thus, as shown in FIG. 4B, the second bonded molecules 220 are bonded to the second bonding surface 120 of the second bonded member 12 via the silanol groups to form a second bonded molecular layer 22. Next, as shown in FIG. 5A, a surface of the second bonded molecular layer 22 is exposed to a solution containing the second binding molecules 320, and then dried. Thus, as shown in FIG. 5B, the silanol groups of the second bonded molecules 220 are bonded to the silanol groups of the second binding molecules 320 to form a second binding layer 32.

Figure 7A:
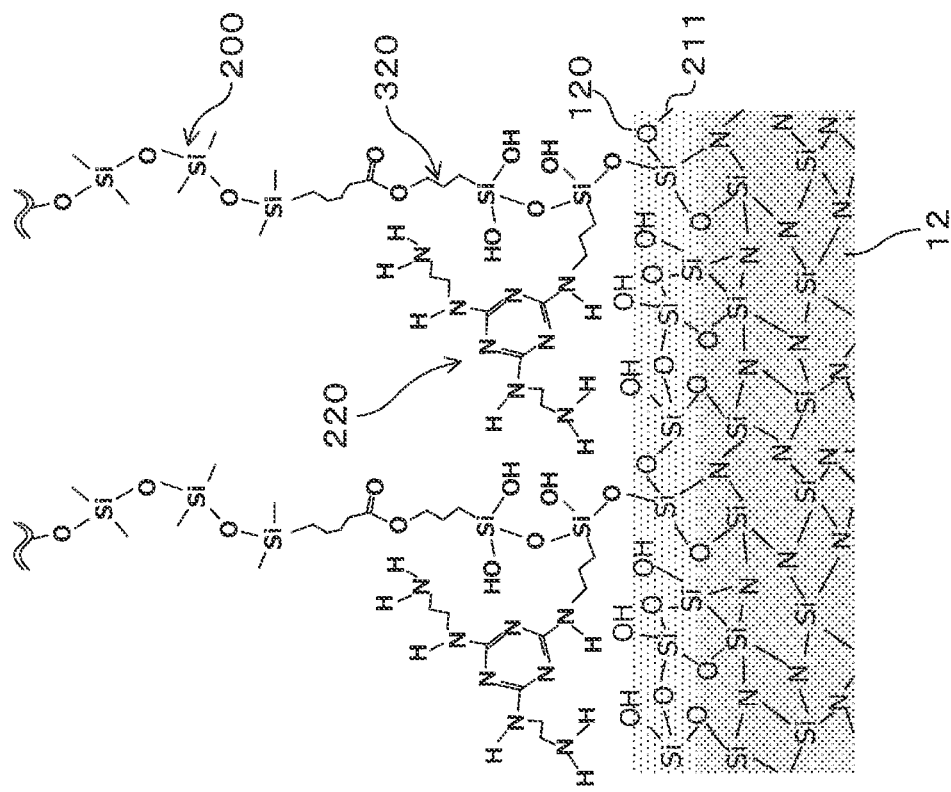
Figure 7B:
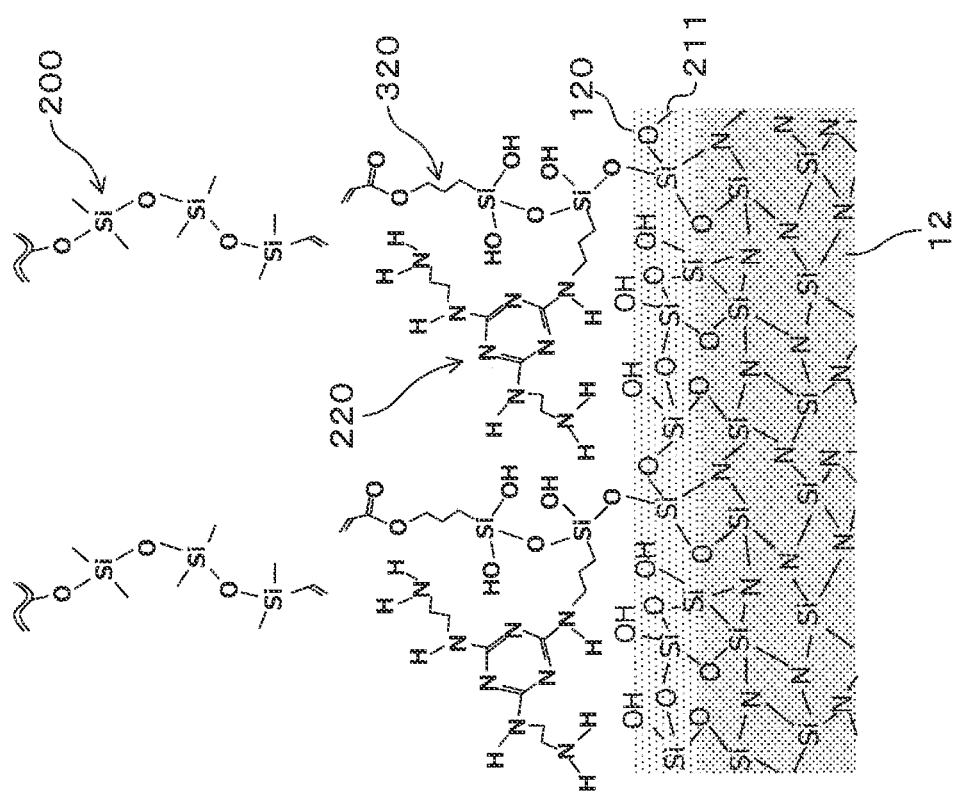

Next, a solution containing the chain polymers 200 having a silicone backbone and vinyl groups at both ends as shown in FIG. 6C, a cross-linking agent such as dicumyl peroxide, and a diluting solvent is prepared. Then, as shown in FIGS. 6A and 7A, the solution is applied to at least one of a surface of the first binding layer 31 and a surface of the second binding layer 32, followed by volatilization of the solvent. Then, the first bonding surface 110 and the second bonding surface 120 are bonded to each other, and subjected to thermocompression bonding. The thermocompression bonding may be performed, for example, in atmospheric air at a temperature of 190° C., a pressure of 0.1 MPa and a pressurization time of 45 minutes. Thus, as shown in FIGS. 6B and 7B, the vinyl groups at the first ends of the chain polymers 200 are bonded to the acryloxy groups of the first binding molecules 310 while the vinyl groups at the second ends of the chain polymers 200 are bonded to the acryloxy groups of the second binding molecules 320 to form a bonding layer 2.

Thus, the bonded structure 1 of the present embodiment as shown in FIG. 2 can be prepared.

In the bonded structure 1 of the present embodiment, the first bonded member 11 is made of copper or a copper alloy. This is advantageous for ensuring electrical conductivity and thermal conductivity. Further, in the bonded structure 1 of the present embodiment, the second bonded member 12 is made of silicon nitride. This is advantageous for ensuring strength and insulation. Further, in the bonded structure 1 of the present embodiment, molecules having a triazine ring, such as N, N'-bis(2-aminoethyl)-6-(3-triethoxysilylpropyl)amino-1,3,5-triazine-2,4-diamine, are used as the first bonded molecules 210 and the second bonded molecules 220. Therefore, the bonding layer 2 can be adsorbed to the first bonding surface 110 and the second bonding surface 120 at high density, which is advantageous for improving the interfacial bondability to each of the first bonding surface 110 and the second bonding surface 120. Further, in the bonded structure 1 of the present embodiment, the main chain constituting the chain polymer 200 is a silicone chain. Therefore, the silicone chain, which can be in a folded form and an unfolded form, can enhance the stress relaxation effect by expansion and contraction of the silicone chain. Further, in the bonded structure 1 of the present embodiment, the chain polymer 200 having vinyl groups as terminal functional groups is used. This provides excellent reactivity with an acryloxy group.

Further, in the bonded structure 1 of the present embodiment, molecules having an acryloxy group and a silanol group, such as acryloxypropyltrialkoxysilane, are used as the first binding molecules 310 and the second binding molecules 320. The rate of reaction of the terminal vinyl groups of the chain polymers 200 with the acryloxy groups of the first binding molecules 310 and the second binding molecules 320 is higher than the rate of reaction between the terminal vinyl groups of the chain polymers 200. Accordingly, in manufacturing the bonded structure 1, adjacent chain polymers 200 are not likely to polymerize with each other via the terminal vinyl groups, while the terminal vinyl groups of the chain polymers 200 can preferentially react with the acryloxy groups of the first binding molecule 310 and the second binding molecule 320. Therefore, according to the bonded structure 1 of the present embodiment, it is possible to ensure a bond between the first end of the chain polymer 200 and the first binding molecule 310, and a bond between the second end of the chain polymer 200 and the second binding molecule 320.

According to the present embodiment, a bonded structure 1 having high stress relaxation effect and bond strength is obtained. Other configurations and operational effects are the same as those of the first embodiment.

Third Embodiment

Figure 8:
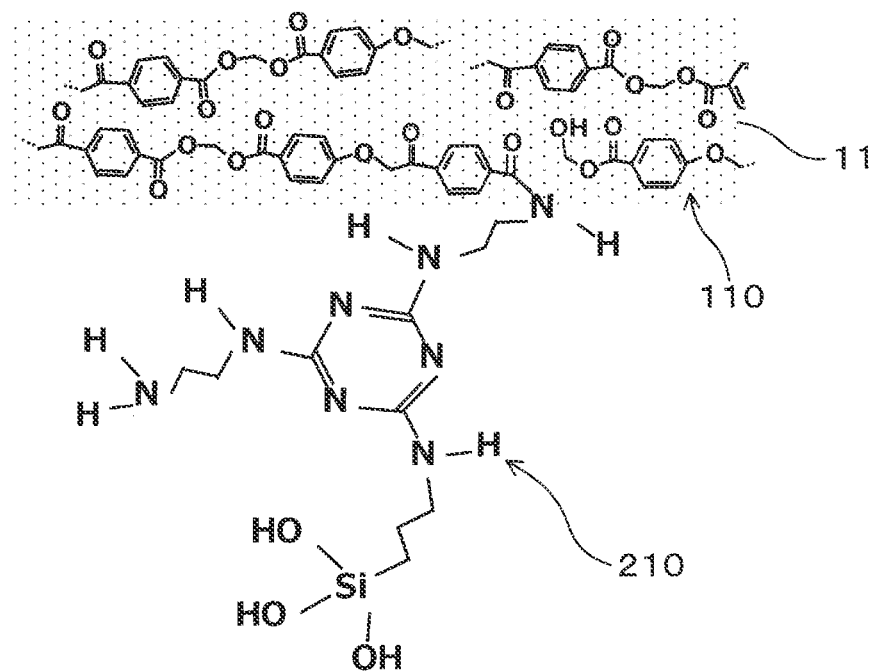
FIG. 8 is a view illustrating a part of a method of producing a bonded structure of a third embodiment.

With reference to FIG. 8, a bonded structure of a third embodiment will be described. As illustrated in FIG. 8, in the bonded structure 1 of the present embodiment, the first bonded member 11 is made of a resin material, specifically liquid crystal polymer (LCP). The bonded structure 1 of the present embodiment is an example in which a liquid crystal polymer and silicon nitride, which are largely different in linear expansion coefficient, are combined. FIG. 8 corresponds to FIG. 3A referred to in the description of the bonded structure of the second embodiment. In FIG. 8, the first bonded molecules 210 are bonded to the first bonding surface 110 of the first bonded member 11 made of LCP, and the first binding molecules 310 (not shown) are bonded to the first bonded molecules 210 in the same manner as in the second embodiment. Other configurations are the same as those of the second embodiment.

According to the present embodiment, a bonded structure 1 having high stress relaxation effect and bond strength is obtained. Other operational effects are the same as those of the second embodiment.

Fourth Embodiment

Figure 9:
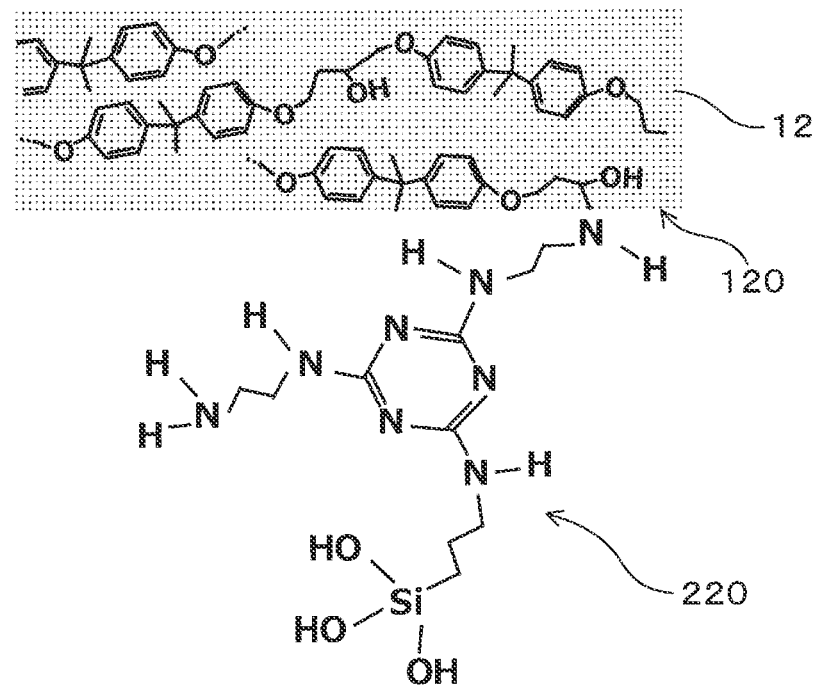
FIG. 9 is a view illustrating a part of a method of producing a bonded structure of a fourth embodiment.

With reference to FIG. 9, a bonded structure of a fourth embodiment will be described. As illustrated in FIG. 9, in the bonded structure 1 of the present embodiment, the second bonded member 12 is made of a resin material, specifically an epoxy resin. The bonded structure 1 of the present embodiment is an example in which a copper or a copper alloy and an epoxy resin, having similar linear expansion coefficients, are combined. FIG. 9 corresponds to FIG. 4B referred to in the description of the bonded structure of the second embodiment. In FIG. 9, the second bonded molecules 220 are bonded to the second bonding surface 120 of the second bonded member 12 made of an epoxy resin, and the second binding molecules 320 (not shown) are bonded to the second bonded molecules 220 in the same manner as in the second embodiment. Other configurations are the same as those of the second embodiment.

According to the present embodiment, a bonded structure 1 having high stress relaxation effect and bond strength is obtained. Other operational effects are the same as those of the second embodiment.

Experimental Example 1

<Preparation of Test Specimen>
—Test Specimen 1—
The following materials were prepared as the materials used for producing Test specimen 1.
First Bonded Member
A copper plate ("CU-113421" manufactured by Nilaco Corporation) having a size of 10 mm×40 mm and a thickness of 0.3 mm was prepared.

Second Bonded Member
A silicon nitride plate ("SiN white plate TSN-90" manufactured by Toshiba Materials Co., Ltd.) having a size of 10 mm×40 mm and a thickness of 0.32 mm was prepared.
Chain Polymers
A silicone polymer ("DMS-V31" manufactured by Gelest, Inc.) having a linear silicone backbone and vinyl groups at both ends was prepared. The molecular weight of the chain polymer was 30,000.
Bonded Molecules
N, N'-bis(2-aminoethyl)-6-(3-triethoxysilylpropyl)amino-1,3,5-triazine-2,4-diamine ("MB-1015" manufactured by Sulfur Chemical Laboratory Inc.) was prepared.
Binding Molecules
Acryloxypropyltrimethoxysilane ("KBM-5103" manufactured by Shin-Etsu Chemical Co., Ltd.) was prepared.

A copper plate was immersed in acetone at a temperature of 25° C., and degreased by ultrasonic treatment at a frequency of 40 kHz for 3 minutes. Then, the copper plate was taken out, flushed with acetone, and dried with a dryer at a temperature of 60° C. for 30 seconds. The degreased copper plate was immersed in a 0.2% HCl aqueous solution at a temperature of 25° C. for 10 seconds to remove the oxide film on the surface, washed with water, and dried with a dryer in the same manner as described above.

A silicon nitride plate was immersed in acetone at a temperature of 25° C., and degreased by ultrasonic treatment at a frequency of 40 kHz for 10 seconds. Then, the silicon nitride plate was taken out, flushed with acetone, and dried with a dryer in the same manner as described above. Then, the surface of the degreased silicon nitride plate was activated by corona plasma treatment under the conditions of an applied voltage of 12.5 kV, 6 reciprocations, and a sweep rate (scan rate) of 30 mm/sec. The corona plasma treatment was performed using Corona Master manufactured by Shinko Electric & Instrumentation Co., Ltd. Then, the surface of the silicon nitride plate, which has been subjected to corona plasma treatment, was immersed in a 50 g/L sodium silicate aqueous solution at a temperature of 60° C., washed with water, and dried with a dryer in the same manner as described above.

Then, the surface on one side of the copper plate, from which the oxide film had been removed, was immersed in a 1% solution of the above bonded molecules for 300 seconds, and dried with a dryer in the same manner as described above. Then, the surface of the copper plate, which has been treated with the bonded molecules, was immersed in a 1% solution of the above binding molecules for 300 seconds, and dried naturally for 3 minutes. The surface on one side of the silicon nitride plate, which has been subjected to the corona plasma treatment and alkali treatment, was immersed in a 1% solution of the above bonded molecules for 300 seconds, and dried with a dryer in the same manner as described above. Then, the surface of the silicon nitride plate, which has been treated with the bonded molecules, was immersed in a 1% solution of the above binding molecules for 300 seconds, and dried naturally for 20 minutes. This experimental example is an example in which the binding molecules are used.

Next, a hexane solution containing the chain polymers and dicumyl peroxide was applied dropwise, at a predetermined thickness, to each of the bonding surfaces of the copper plate and the silicon nitride plate which have been subjected to the above pretreatments, and dried naturally for 10 minutes to volatilize the hexane. The amount of the dicumyl peroxide was 3 parts by mass per 100 parts by mass of the chain polymers. The bonding surfaces were bonded to each other, and subjected to thermocompression bonding in atmospheric air at a temperature of 190° C., a pressure of 0.1 MPa and a pressurization time of 45 minutes. The thermocompression bonding was performed using a screw heater press machine manufactured NPa system Co., Ltd. Thus, a test specimen 1 was obtained.

—Test Specimen 1C—

A test specimen 1C was prepared in the same manner as with the test specimen 1 except that the surfaces of the copper plate and the silicon nitride plate were not treated with the bonded molecules or binding molecules.

—Test Specimen 2C—

A test specimen 2C was prepared in the same manner as with the test specimen 1 except that the vinyltrimethoxysilane ("KBM-1003" manufactured by Shin-Etsu Chemical Co., Ltd.) was used as the binding molecules.

—Test Specimen 3C—

A test specimen 3C was prepared in the same manner as with the test specimen 1 except that a silicone polymer having a vinyl group in a side chain ("VDT-131" manufactured by Gelest Inc.) was used in place of the chain polymer as the binding molecules.

—Test Specimen 2—

An LCP plate ("CT-Z" manufactured by Kuraray Co., Ltd.) having a size of 10 mm×40 mm and a thickness of 50 μm was prepared as the first bonded member. Then, the LCP plate was immersed in acetone at a temperature of 25° C., and degreased by ultrasonic treatment at a frequency of 40 kHz for 3 minutes. Then, the LCP plate was taken out, flushed with acetone, and dried with a dryer at a temperature of 60° C. for 30 seconds. Then, the surface of the degreased LCP plate was activated by corona plasma treatment under the conditions of an applied voltage of 12.5 kV, 3 reciprocations, and a sweep rate of 30 mm/sec. The surface on one side of the LCP plate, which has been subjected to the corona plasma treatment, was immersed in a 1% solution of the above bonded molecules for 300 seconds, and dried with a dryer in the same manner as described above. Then, the surface of the LCP plate, which has been treated with the bonded molecules, was immersed in a 1% solution of the above binding molecules for 300 seconds, and dried naturally for 20 minutes.

Thereafter, the same process as with the test specimen 1 was performed for the pretreated LCP plate instead of the pretreated copper plate to thereby prepare a test specimen 2.

—Test Specimen 3—

A test specimen 3 was prepared in the same manner as with the test specimen 2 except that a 20 vol % inorganic filler was added to the hexane solution containing the chain polymers and dicumyl peroxide.

—Test Specimen 4C—

A test specimen 4C was prepared in the same manner as with the test specimen 2 except that the surfaces of the LCP plate and the silicon nitride plate were not treated with the bonded molecules or binding molecules.

—Test Specimen 5C—

A test specimen 5C was prepared in the same manner as with the test specimen 3 except that the surfaces of the LCP plate and the silicon nitride plate were not treated with the bonded molecules or binding molecules.

<Shear Bond Strength Evaluation>

Using a table-top precision universal tester (manufactured by Shimadzu Corporation, "Autograph AGS-X"), a tensile shear strength test was performed on the bonded structure of each test specimen. Specifically, a tensile shear bond strength of the bonding layer was determined from the tensile force applied when the strength dropped due to the fracture of the test specimen. The amount of displacement of the bonding layer from the displacement start point to the fracture was defined as a shear displacement (μm), and a value obtained by dividing the shear displacement by the thickness (μm) of the bonding layer at 25° C. was defined as an elongation of the bonding layer (μm/μm). A Young's modulus of the bonding layer was calculated from the thickness of the bonding layer and the obtained relationship curve between the tensile shear bond strength and the shear displacement. Specifically, a rigidity was calculated from the formula: rigidity=average inclination×thickness of bonding layer, using the thickness of the bonding layer and an average inclination from the displacement start point at which the displacement starts and the shear strength is exerted to the tensile strength exerted at the displacement of 0.05 mm. Then, using the calculated rigidity, a Young's modulus of the bonding layer was calculated from the formula: Young's modulus=rigidity×2×(1+Poisson's ratio of the bonding layer). Further, for the test specimen 2, the test specimen 3, the test specimen 4C and the test specimen 5C, the amount of displacement from the displacement start point to a point at which the tensile strength reaches 0.1 MPa was used as the shear displacement. The reason for this is that, since the LCP plate is also stretched when a tensile force is applied, the shear displacement is measured using the amount of displacement to a degree that the LCP plate is approximated to the rigid body by the tensile force.

Furthermore, the fracture surface morphology of the test specimens after the tensile shear strength test was visually inspected. When the fracture surface was observed in which the bonding layer was present on the entire bonding surface of both the first bonded member and the second bonded member, it was determined as bonding layer fracture. Further, when the fracture surface was observed in which the bonding layer was not present on the bonding surface of at least one of the first bonded member and the second bonded member, it was determined as interfacial fracture.

Figure 10:
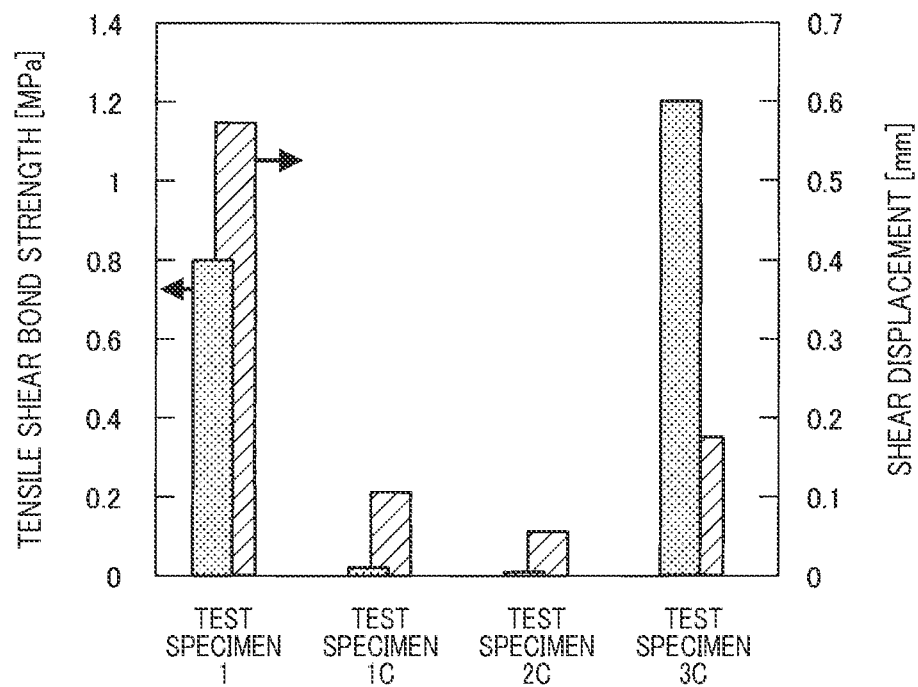
FIG. 10 is a graph showing the tensile shear strength and the shear displacement of a test specimen 1, a test specimen 1C, a test specimen 2C and a test specimen 3C in Experimental Example 1.
Figure 11:
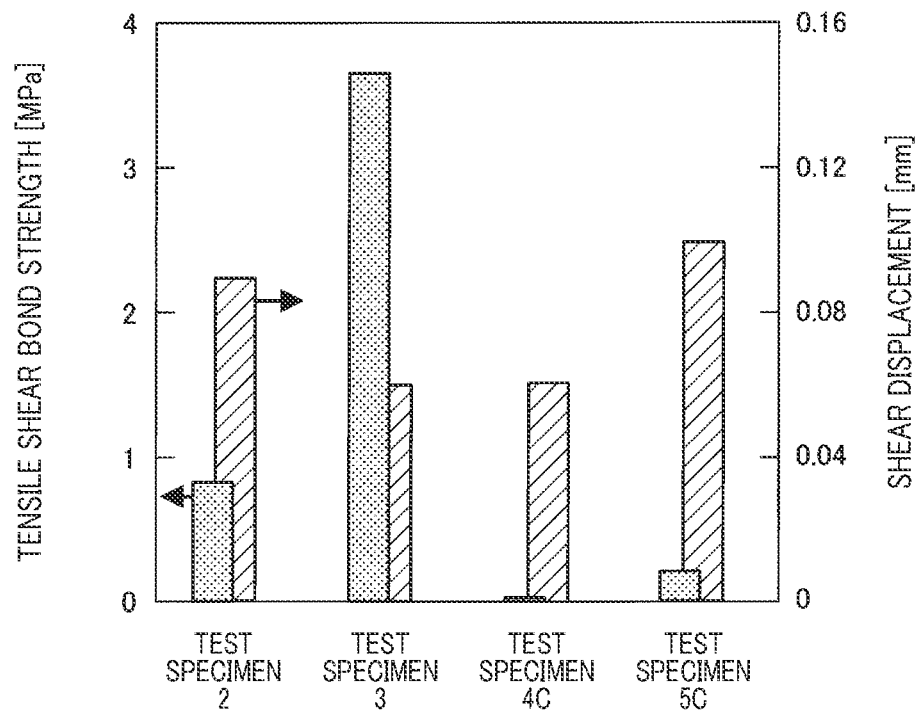
FIG. 11 is a graph showing the tensile shear bond strength and the shear displacement of a test specimen 2, a test specimen 3, a test specimen 4C and a test specimen 5C in Experimental Example 1.

Table 1 shows the details and evaluation results of the test specimen 1, the test specimen 1C, the test specimen 2C and the test specimen 3C. FIG. 10 shows the graph of tensile shear strength and shear displacement of the test specimen 1, the test specimen 1C, the test specimen 2C and the test specimen 3C. Further, Table 2 shows the details and evaluation results of the test specimen 2, the test specimen 3, the test specimen 4C and the test specimen 5C. FIG. 11 shows the graph of tensile shear strength and shear displacement of the test specimen 2, the test specimen 3, the test specimen 4C and the test specimen 5C. The shear displacement in FIG. 11 is the shear displacement from the start of displacement to the tensile strength of 0.1 MPa.

TABLE 1

|  | Test specimen | | | |
|---|---|---|---|---|
|  | 1 | 1C | 2C | 3C |
| First bonded member | Cu | Cu | Cu | Cu |
| Linear expansion coefficient (ppm/° C.) | 16.5 | 16.5 | 16.5 | 16.5 |

TABLE 1-continued

| | Test specimen | | | |
|---|---|---|---|---|
| | 1 | 1C | 2C | 3C |
| Second bonded member | $Si_3N_4$ | $Si_3N_4$ | $Si_3N_4$ | $Si_3N_4$ |
| Linear expansion coefficient (ppm/° C.) | 4 | 4 | 4 | 4 |
| Chain polymer | | | | |
| Type | Silicone | Silicone | Silicone | Silicone |
| Molecular weight | 30,000 | 30,000 | 30,000 | 30,000 |
| Molecular form | Linear | Linear | Linear | Linear |
| Functional group | Vinyl group | Vinyl group | Vinyl group | Vinyl group |
| Binding molecule Functional group | Acryloxy group | | Acryloxy group | Acryloxy group |
| Bonding layer | | | | |
| Thickness (μm) | 8 | 9 | 11 | 8 |
| Tensile shear strength (MPa) | 0.8 | 0.02 | 0.01 | 1.2 |
| Shear displacement (mm) | 0.58 | 0.11 | 0.06 | 0.18 |
| Elongation (μm/μm) | 72.5 | 12.2 | 5.45 | 22.5 |
| Young's modulus (MPa) | 0.45 | 0.05 | 0.04 | 2.17 |
| Evaluation | | | | |
| Fracture surface morphology | Bonding layer fracture | Interfacial fracture | Interfacial fracture | Bonding layer fracture |

TABLE 2

| | Test specimen | | | |
|---|---|---|---|---|
| | 2 | 3 | 4C | 5C |
| First bonded member | LCP | LCP | LCP | LCP |
| Linear expansion coefficient (ppm/° C.) | 18 | 18 | 18 | 18 |
| Second bonded member | $Si_3N_4$ | $Si_3N_4$ | $Si_3N_4$ | $Si_3N_4$ |
| Linear expansion coefficient (ppm/° C.) | 4 | 4 | 4 | 4 |
| Chain polymer | | | | |
| Type | Silicone | Silicone (including 20 vol % inorganic filler) | Silicone | Silicone (including 20 vol % inorganic filler) |
| Molecular weight | 30,000 | 30,000 | 30,000 | 30,000 |
| Molecular form | Linear | Linear | Linear | Linear |
| Functional group | Vinyl group | Vinyl group | Vinyl group | Vinyl group |
| Binding molecule Functional group | Acryloxy group | Acryloxy group | | |
| Bonding layer | | | | |
| Thickness (μm) | 9 | 13 | 7 | 11 |
| Tensile shear strength (MPa) | 0.82 | 3.66 | 0.02 | 0.2 |
| Shear displacement (mm) | 0.09 | 0.06 | 0.06 | 0.1 |
| Elongation (μm/μm) | 10 | 4.6 | 8.6 | 9 |
| Young's modulus (MPa) | 0.32 | 0.33 | 0.61 | 0.24 |
| Evaluation | | | | |
| Fracture surface morphology | Bonding layer fracture | Bonding layer fracture | Interfacial fracture | Interfacial fracture |

Table 1, Table 2, FIG. 10 and FIG. 11 show the following findings. In the test specimen 1C, the test specimen 4C and the test specimen 5C, which include no bonded molecular layer and no binding molecular layer, the fracture surface morphology is interfacial fracture. Further, in test specimen 2C, the fracture surface morphology is also interfacial fracture. The reason for this seems to be that the terminals of the chain polymers fail to preferentially bind to the binding molecules since the rate of reaction between the terminal vinyl groups of the chain polymers is higher than the rate of reaction of the terminal vinyl groups of the chain polymers with the vinyl groups of the binding molecules. In the test specimen 3C, the fracture surface morphology is bonding layer fracture, but the shear displacement of the bonding layer is small, the elongation is poor, and the stress relaxation effect is poor. The reason for this seems to be that a large number of bonds are formed between the vinyl groups in the side chains of the above silicone polymer used for forming the stress relaxation layer.

On the other hand, in all the test specimen 1, the test specimen 2 and the test specimen 3, the fracture surface morphology is bonding layer fracture, and the tensile shear bond strength is high, suppressing occurrence of interfacial peeling between the bonded member and the bonding layer. Further, the test specimen 1, the test specimen 2 and the test specimen 3, in which interfacial peeling of the bonding layer is suppressed, are found to sufficiently exhibit stress relaxation performance by the stress relaxation layer. Further, the test specimen 1, the test specimen 2 and the test specimen 3, in which the shear displacement of the bonding layer is large and good elongation can be exhibited, are found to be excellent in stress relaxation performance. The reason for this seems to be that the terminal vinyl groups of the chain polymers preferentially bind to the binding molecules, suppressing polymerization of adjacent chain polymers in the vicinity of the interface of the bonded member.

Experimental Example 2

<Preparation of Test Specimen>
—Test Specimen 4—

A test specimen 4 was prepared in the same manner as with the test specimen 1 in Experimental Example 1 except that a copper plate having a size of 25 mm×25 mm and a thickness of 3 mm and a silicon nitride plate having a size of 25 mm×25 mm and a thickness of 0.32 mm were prepared.

—Test Specimen 5—

A test specimen 5 was prepared in the same manner as with the test specimen 4 except that a 40 vol % inorganic filler was added to the hexane solution containing the chain polymers and dicumyl peroxide.

—Test Specimen 6C—

A test specimen 6C was prepared in the same manner as with the test specimen 4 except that a 40 vol % inorganic filler was added to the hexane solution containing the chain polymers and dicumyl peroxide, and the surfaces of the cupper plate and the silicon nitride plate were not treated with the bonded molecules or binding molecules.

<Shear Bond Strength Evaluation>

The same tensile shear bond strength evaluation as that in Experimental Example 1 was performed for the test specimen 5 and the test specimen 6C. However, the sizes of the copper plate and the silicon nitride plate were the sizes described in Experimental Example 2.

<Evaluation of Resistance to Thermal Cycle>

Evaluation of resistance to thermal cycle was performed for each test specimen. Specifically, each test specimen was subjected to a cooling/heating cycle, and then checked for presence or absence of peeling of the bonding layer using an ultrasonic imaging device (SAT). In this testing, the cooling/heating cycle was performed in a liquid phase while immersing the test specimen in Galden. In each cycle, the test specimen was held at normal temperature→150° C. for 5 minutes→at normal temperature for 30 seconds→at −40° C. for 5 minutes→at normal temperature for 30 seconds. In this Experimental Example, 5,000 cooling/heating cycles were performed. As an ultrasonic imaging device, a C-SAM Gen6 manufactured by Sonoscan, Inc. was used with a transducer at 50 MHz.

In the image obtained by the ultrasonic imaging device, a white region and a dark gray region that can be recognized as contrast were defined as a peeled portion and non-peeled portion of the bonding layer, respectively. When the area of the white region expanded to 5% or more at 5,000 cycles, it was determined that interfacial peeling of the bonding layer due to thermal cycle has occurred. When the area of the white region is less than 5% at 5,000 cycles, it was determined that interfacial peeling of the bonding layer due to thermal cycle has not occurred.

Table 3 shows the details and evaluation results of the test specimen 4, the test specimen 5 and the test specimen 6C.

TABLE 3

| | Test specimen | | |
|---|---|---|---|
| | 4 | 5 | 6C |
| First bonded member | Cu | Cu | Cu |
| Linear expansion coefficient (ppm/° C.) | 16.5 | 16.5 | 16.5 |
| Second bonded member | $Si_3N_4$ | $Si_3N_4$ | $Si_3N_4$ |
| Linear expansion coefficient (ppm/° C.) | 4 | 4 | 4 |
| Chain polymer | | | |
| Type | Silicone | Silicone (including 40 vol % inorganic filler) | Silicone (including 40 vol % inorganic filler) |
| Molecular weight | 30,000 | 30,000 | 30,000 |
| Molecular form | Linear | Linear | Linear |
| Functional group | Vinyl group | Vinyl group | Vinyl group |
| Binding molecule Functional group | Acryloxy group | Acryloxy group | |
| Bonding layer | | | |
| Thickness (μm) | 12 | 20 | 19 |
| Tensile shear strength (MPa) | 0.8 | 3.4 | 0.2 |
| Shear displacement (mm) | 0.58 | 0.33 | 0.04 |
| Elongation (μm/μm) | 72.5 | 16.5 | 2.1 |
| Young's modulus (MPa) | 0.45 | 0.65 | 0.58 |
| Evaluation | | | |
| Fracture surface morphology | Bonding layer fracture | Bonding layer fracture | Interfacial fracture |
| Peeling due to thermal cycle | No | No | Yes |

Table 3 shows the following findings. In the test specimen 6C, which includes no bonded molecular layer and no binding molecular layer, the fracture surface morphology is interfacial fracture, and interfacial peeling of the bonding layer due to thermal cycle has occurred.

On the other hand, in the test specimen 4 and the test specimen 5, regardless of whether the stress relaxation layer includes an inorganic filler, the fracture surface morphology is bonding layer fracture, and interfacial peeling of the bonding layer due to thermal cycle has not occurred. These results show that, according to the configuration of the present disclosure, it is possible to provide a bonded structure capable of ensuring high resistance to thermal cycles, relaxation of thermal stress and high bond strength, even when different materials having different linear expansion coefficients are bonded together.

Experimental Example 3

<Preparation of Test Specimen>
—Test Specimen 6—

The following materials were prepared as the materials used for producing Test specimen 6.
First Bonded Member A copper plate ("CU-113421" manufactured by Nilaco Corporation) having a size of 10 mm×40 mm and a thickness of 0.3 mm was prepared.

Chain Polymers

A silicone polymer ("DMS-V31" manufactured by Gelest, Inc.) having a linear silicone backbone and vinyl groups at both ends was prepared. The molecular weight of the chain polymer was 30,000.

Bonded Molecules

N, N'-bis(2-aminoethyl)-6-(3-triethoxysilylpropyl)amino-1,3,5-triazine-2,4-diamine ("MB-1015" manufactured by Sulfur Chemical Laboratory Inc.) was prepared.

Binding Molecules

Acryloxypropyltrimethoxysilane ("KBM-5103" manufactured by Shin-Etsu Chemical Co., Ltd.) was prepared.

The bonding surface of the copper plate was pretreated in the same manner as with the test specimen 1 in Experimental Example 1, whereby the above bonded molecules are bonded to the bonding surface of the copper plate and the binding molecules are bonded to the bonded molecules.

Then, a solution containing the chain polymers and dicumyl peroxide was prepared. The amount of the dicumyl peroxide was 3 parts by mass per 100 parts by mass of the chain polymers. Then, a cured silicone frame configured to allow the chain polymers to be in contact with the bonding surface of the pretreated copper plate and prevent them from flowing in the planar direction was prepared, and a solution containing the chain polymers and dicumyl peroxide was introduced into the frame. Then, the chain polymers were cured in atmospheric air at a temperature of 190° C., a pressure of 0.1 MPa and a pressurization time of 45 minutes. Thus, a test specimen 6 was obtained.

—Test Specimen 7—

A silicone polymer ("EM2-EX-100A" manufactured by Gelest, Inc.) having a linear silicone backbone, a silyl group at the first end and a vinyl group at the second end was prepared. The chain polymer had molecular weight of 100,000, and a 30 vol % inorganic filler was added thereto. A solution containing the chain polymers and a platinum catalyst was prepared. The amount of the platinum catalyst was 0.5 parts by mass per 100 parts by mass of the chain polymers.

A test specimen 7 was prepared in the same manner as with the test specimen 6 except that the solution containing the chain polymers and platinum catalyst was introduced into the frame.

—Test Specimen 7C—

A test specimen 7C was prepared in the same manner as with the test specimen 6 except that the surface of the copper plate was not treated with the bonded molecules or binding molecules.

—Test Specimen 8C—

A test specimen 8C was prepared in the same manner as with the test specimen 7 except that the surface of the copper plate was not treated with the bonded molecules or binding molecules.

—Test Specimen 9C—

A test specimen 9C was prepared in the same manner as with the test specimen 6 except that the surface of the copper plate was treated with the bonded molecules but not treated with the binding molecules.

—Test Specimen 10C—

A test specimen 10C was prepared in the same manner as with the test specimen 7 except that the surface of the copper plate was treated with the bonded molecules but not treated with the binding molecules.

<Evaluation of Interfacial Bondability of Bonding Layer to Solvent>

Each test specimen was immersed in hexane for 24 hours and taken out therefrom, and immediately after being taken out was inspected for the presence of interfacial peeling. Then, they were categorized into those in which the bonding layer swelled immediately after being taken out and interfacial peeling of the bonding layer has already occurred and those in which interfacial peeling has not occurred but the bonding layer fracture occurred when peeled by hand.

Table 4 shows the details and evaluation results of the test specimen 6, the test specimen 7 and the test specimens 7C to 10C.

TABLE 4

|  | Test specimen | | | | | |
| --- | --- | --- | --- | --- | --- | --- |
|  | 6 | 7 | 7C | 8C | 9C | 10C |
| First bonded member | Cu | Cu | Cu | Cu | Cu | Cu |
| Linear expansion coefficient (ppm/° C.) | 16.5 | 16.5 | 16.5 | 16.5 | 16.5 | 16.5 |
| Chain polymer |  |  |  |  |  |  |
| Type | Silicone | Silicone (including 30 vol % inorganic filler) | Silicone | Silicone (including 30 vol % inorganic filler) | Silicone | Silicone (including 30 vol % inorganic filler) |
| Molecular weight | 30,000 | 100,000 | 30,000 | 100,000 | 30,000 | 100,000 |
| Molecular form | Linear | Linear | Linear | Linear | Linear | Linear |
| Functional group | Vinyl group | Silyl group/vinyl group | Vinyl group | Silyl group/vinyl group | Vinyl group | Silyl group/vinyl group |
| Binding molecule Functional group | Acryloxy group | Acryloxy group |  |  |  |  |
| Evaluation |  |  |  |  |  |  |
| Peeling due to swelling | No | No | Yes | Yes | Yes | Yes |

Table 4 shows the following findings. In the test specimen 7C and the test specimen 8C, which include no bonded molecular layer and no binding molecular layer, the bonding layer has poor interfacial bondability to the solvent. Further, in the test specimen 9C and the test specimen 10C, which include only the bonded molecular layer, the bonding layer has poor interfacial bondability to the solvent. The reason for this seems to be as follows. That is, the terminal functional groups of the chain polymers preferentially bind to the functional groups of the binding molecules, so that a binding density that maintains the interfacial bondability is ensured. On the other hand, if there are no binding molecules, the binding reaction with the interface becomes insufficient, leading to insufficient binding density with the interface, which causes the solvent to easily penetrate into the interface. Therefore, the bonding layer is found to have poor interfacial bondability to the solvent. Further, the silanol groups or the amino groups contained in the bonded molecules basically do not react with vinyl groups and silyl groups. Although the amino groups exhibit adsorption force and adhesion force, they are similar to hydrogen bonds, leading to solvent penetration into the interface as described above.

On the other hand, in the test specimen 6 and the test specimen 7, the bonding layer is found to be less likely to cause interfacial peeling even after exposed to the solvent.

Since a silicone-based chain polymer was used in this experimental example, the evaluation of the interfacial bondability of the bonding layer was performed by the method described above. When another type of chain polymer is used, washing with a detergent capable of dissolving the bonding layer is performed. Then, the resin components and the bonding reaction structure are identified by a known method such as XPS analysis or FT-IR analysis on the bonding surface of the bonded member to evaluate and determine the interfacial bondability.

Experimental Example 4

<Preparation of Test Specimen>
—Test Specimen 8—

A test specimen 8 was prepared in the same manner as with the test specimen 1 in Experimental Example 1 except that a copper plate having a size of 10 mm×10 mm and a thickness of 0.3 mm and a silicon nitride plate having a size of 10 mm×10 mm and a thickness of 0.32 mm were prepared.

—Test Specimen 11C—

A test specimen 11C was prepared in the same manner as with the test specimen 1 in Experimental Example 1 except that the surfaces of the copper plate and the silicon nitride plate were not treated with the bonded molecules or binding molecules.

<Evaluation of Anisotropic Thermal Expansion of Bonding Layer>

For the bonded structure of each test specimen, thermomechanical analysis (TMA) was performed to evaluate thermal linear expansion of the bonding layer in the lamination direction due to a change in thickness in the lamination direction caused by temperature change.

Specifically, the bonded structure of each test specimen was installed in a thermomechanical analyzer in normal temperature, and a change in thickness of the bonding layer in the lamination direction was measured under a nitrogen atmosphere in the temperature profile of normal temperature→−10° C.→210° C.→−10° C.→210° C. The heating rate was 10° C./min., and the cooling rate was −20° C./min. In addition, TMA measurement of a simple stack of the copper plate and the silicon nitride plate, which are the members to be bonded, and measurement of the total thickness of the bonded structure were performed in advance. Moreover, a bonded structure cured only with the bonding layer was prepared, and TMA measurement was also performed in advance in the lamination direction and a direction perpendicular to the lamination direction.

A thickness of the bonding layer was calculated by subtracting the thickness of the simple stack of the copper plate and the silicon nitride plate from the total thickness of the bonded structure at the time of the second temperature change from −10° C.→210° C. in the above temperature profile. In addition, the thickness of the bonding layer at each temperature was divided by the thickness of the bonding layer at 25° C. to obtain a normalized value, and a thickness ratio of the bonding layer when the thickness of the bonding layer at 25° C. was taken as 1 was calculated. Further, a linear expansion coefficient of the bonding layer in the lamination direction was calculated from the slope of the tangent at 150° C. in a change in thickness of the bonding layer with temperature. Further, the bonded structure was cut out in parallel to a surface perpendicular to the lamination direction, and the amount of the bonding layer cut out in the direction perpendicular to the lamination direction was defined as a thickness of the bonding layer in the direction perpendicular to the lamination direction. Then, a linear expansion coefficient of the bonding layer in the direction perpendicular to the lamination direction was calculated in the same manner as in calculation of the linear expansion coefficient of the bonding layer in the lamination direction.

Figure 12:
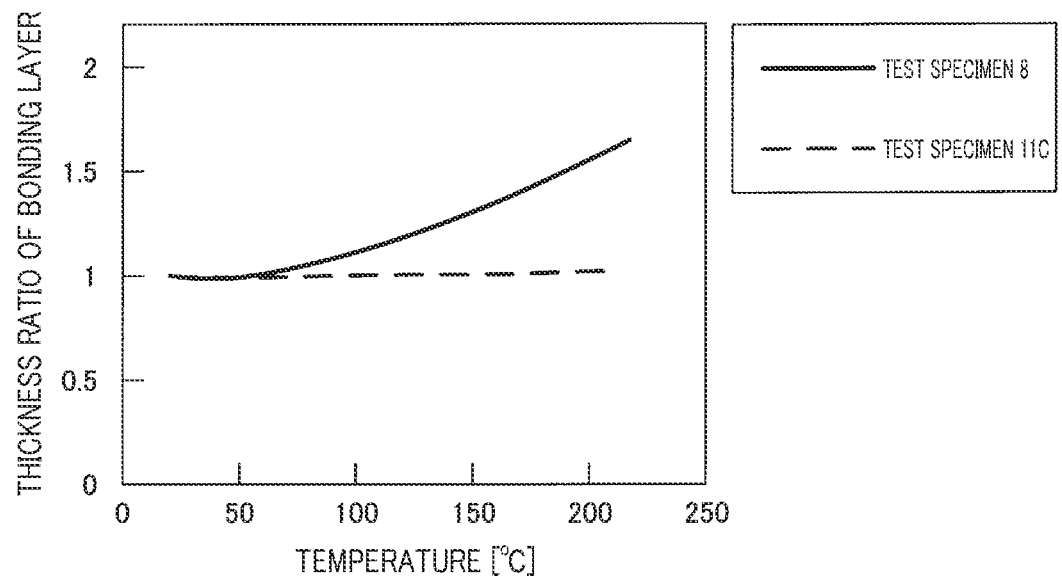
FIG. 12 is a graph showing the relationship between the temperature and the thickness ratio of a bonding layer of a test specimen 8 and a test specimen 11C in Experimental Example 4.
Figure 13:
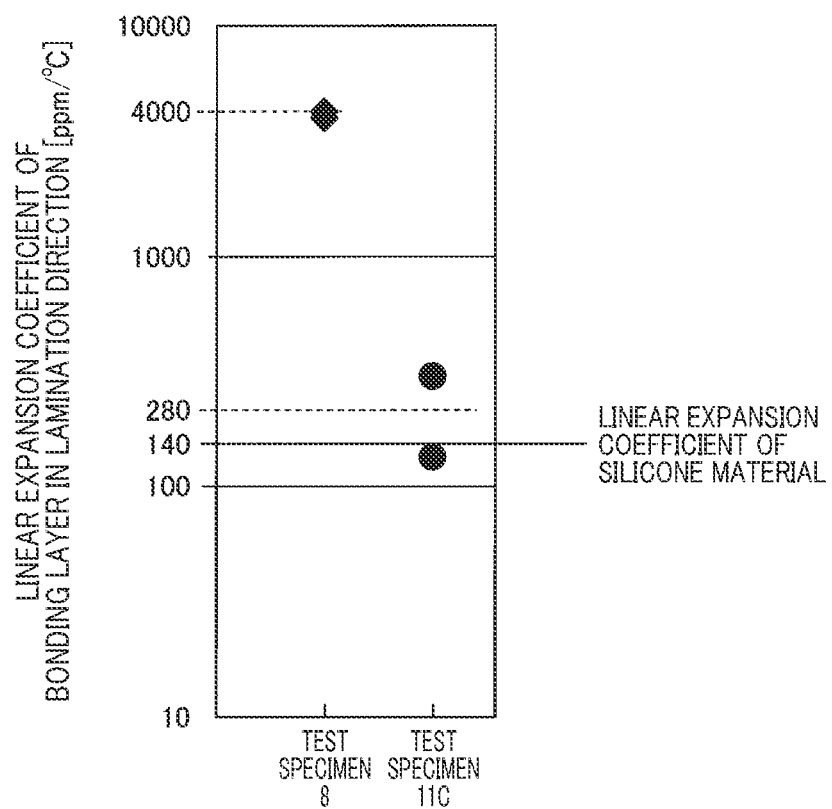
FIG. 13 is a graph showing a linear expansion coefficient of a bonding layer in a lamination direction of a test specimen 8 and a test specimen 11C in Experimental Example 4.

Table 5 shows the details and evaluation results of the test specimen 8 and the test specimen 11C. Further, FIG. 12 shows the relationship between the temperature and the thickness ratio in the test specimen 8 and the test specimen 11C. FIG. 13 shows the linear expansion coefficient of the bonding layer in the lamination direction in the test specimen 8 and the test specimen 11C.

TABLE 5

|  | Test specimen | |
| --- | --- | --- |
|  | 8 | 11C |
| First bonded member | Cu | Cu |
| Linear expansion coefficient (ppm/° C.) | 16.5 | 16.5 |
| Second bonded member | Si$_3$N$_4$ | Si$_3$N$_4$ |
| Linear expansion coefficient (ppm/° C.) | 4 | 4 |
| Chain polymer |  |  |
| Type | Silicone | Silicone |
| Molecular weight | 30,000 | 30,000 |
| Molecular form | Linear | Linear |
| Functional group | Vinyl group | Vinyl group |
| Binding molecule Functional group | Acryloxy group |  |
| Bonding layer |  |  |
| Thickness (μm) | 11 | 14 |
| Anisotropic ratio of thermal expansion | 13 | 2 |

Table 5, FIG. 12 and FIG. 13 show the following findings. The bonding layer of the test specimen 11C does not exhibit extreme expansion and contraction in the lamination direction according to the thermal history, and exhibits thermal expansion coefficients almost similar to the average thermal expansion coefficients of the silicone material in the lamination direction and in the direction perpendicular to the lamination direction. On the other hand, although the test specimen 8 uses the same silicone material, it has a significantly large linear expansion coefficient of the bonding layer in the lamination direction, and exhibits extreme expansion and contraction in the lamination direction according to the thermal history. In the case of the same material composition, when the higher-order structures such as orientation and end fixation as interface boundary conditions are controlled, the thermal expansion in one direction generally decreases as the thermal expansion in the other direction increases due to the relationship between energy and entropy. From the above results, according to the present disclosure, the bonding layer is found to have large thermal expansion anisotropy in the lamination direction.

The present invention should not be construed as limited to the above embodiments and experimental examples, and can be modified in various ways without departing from the spirit of the invention. Further, the configurations described in the embodiments and the experimental examples can be arbitrarily combined.

What is claimed is:

1. A bonded structure comprising:
a first bonded member having a first bonding surface;
a second bonded member having a second bonding surface; and
a bonding layer that bonds the first bonding surface and the second bonding surface, wherein
the bonding layer includes:
a stress relaxation layer containing a chain polymer;
a first bonded molecular layer containing a first bonded molecule bonded to the first bonding surface; and
a second bonded molecular layer containing a second bonded molecule bonded to the second bonding surface,
a first end of the chain polymer is bonded to the first bonded molecule via a first binding molecule or without bonding via the first binding molecule,
a second end of the chain polymer is bonded to the second bonded molecule via a second binding molecule or without bonding via the second binding molecule, and
a third linear expansion coefficient of the first bonded member differs from a fourth linear expansion coefficient of the second bonded member by one or more orders of magnitude.

2. The bonded structure according to claim 1, wherein a bond between the first bonded molecule and the first bonding surface and a bond between the second bonded molecule and the second bonding surface are chemical bonds.

3. The bonded structure according to claim 1, wherein the bonding layer has anisotropic thermal expansion in a lamination direction, and
a first linear expansion coefficient of the bonding layer in the lamination direction is larger than a second linear expansion coefficient of the bonding layer in a direction perpendicular to the lamination direction.

4. The bonded structure according to claim 1, wherein the bonding layer has a thickness of 1 µm or more and 100 µm or less.

5. The bonded structure according to claim 1, wherein the bonding layer has an area of 400 mm$^2$ or more and 60,000 mm$^2$ or less.

6. The bonded structure according to claim 1, wherein the bonding layer has a Young's modulus of 0.005 MPa or more and 1 MPa or less.

7. The bonded structure according to claim 1, wherein the bonding layer has an elongation of 1 µm/µm or more and 100 µm/µm or less.

8. The bonded structure according to claim 1, wherein the bonding layer has a molecular weight of the chain polymer of 5,000 or more and 150,000 or less.

9. A bonded structure comprising:
a first bonded member having a first bonding surface;
a second bonded member having a second bonding surface; and
a bonding layer that bonds the first bonding surface and the second bonding surface, wherein
the bonding layer includes:
a stress relaxation layer containing a chain polymer;
a first bonded molecular layer containing a first bonded molecule bonded to the first bonding surface; and
a second bonded molecular layer containing a second bonded molecule bonded to the second bonding surface,
a first end of the chain polymer is bonded to the first bonded molecule via a first binding molecule or without bonding via the first binding molecule,
a second end of the chain polymer is bonded to the second bonded molecule via a second binding molecule or without bonding via the second binding molecule, and
the bonding layer has a Young's modulus of 0.005 MPa or more and 1 MPa or less.

10. A bonded structure comprising:
a first bonded member having a first bonding surface;
a second bonded member having a second bonding surface; and
a bonding layer that bonds the first bonding surface and the second bonding surface, wherein
the bonding layer includes:
a stress relaxation layer containing a chain polymer;
a first bonded molecular layer containing a first bonded molecule bonded to the first bonding surface; and
a second bonded molecular layer containing a second bonded molecule bonded to the second bonding surface,
a first end of the chain polymer is bonded to the first bonded molecule via a first binding molecule or without bonding via the first binding molecule,
a second end of the chain polymer is bonded to the second bonded molecule via a second binding molecule or without bonding via the second binding molecule, and
the bonding layer has an elongation of 1 µm/µm or more and 100 µm/µm or less.

* * * * *